(12) United States Patent
Kato et al.

(10) Patent No.: US 8,983,007 B2
(45) Date of Patent: Mar. 17, 2015

(54) RECEIVER APPARATUS, RECEPTION METHOD, COMMUNICATION SYSTEM, AND COMMUNICATION METHOD

(71) Applicant: Sharp Kabushiki Kaisha, Osaka (JP)

(72) Inventors: Katsuya Kato, Osaka (JP); Takashi Yoshimoto, Osaka (JP); Ryota Yamada, Osaka (JP); Shinpei Toh, Osaka (JP); Kozue Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/353,048

(22) PCT Filed: Oct. 22, 2012

(86) PCT No.: PCT/JP2012/077185
§ 371 (c)(1),
(2) Date: Apr. 21, 2014

(87) PCT Pub. No.: WO2013/061900
PCT Pub. Date: May 2, 2013

(65) Prior Publication Data
US 2014/0241470 A1    Aug. 28, 2014

(30) Foreign Application Priority Data
Oct. 25, 2011  (JP) ................. 2011-234091

(51) Int. Cl.
*H04L 27/06* (2006.01)
*H04L 27/26* (2006.01)
*H04L 25/02* (2006.01)

(52) U.S. Cl.
CPC ........ *H04L 27/2649* (2013.01); *H04L 27/2647* (2013.01); *H04L 25/0212* (2013.01); *H04L 25/022* (2013.01)

USPC ........... 375/340; 379/349; 370/252; 370/479; 370/480; 455/67.11; 455/226.1

(58) Field of Classification Search
CPC ........................... H04B 7/0632; H04B 7/0626
USPC ......... 375/141, 147, 148, 219, 260, 267, 340, 375/346, 347, 349; 370/252, 319, 321, 343, 370/345, 364, 365, 478, 480; 455/67.11, 455/226.1–226.3
See application file for complete search history.

(56) References Cited

U.S. PATENT DOCUMENTS

| | | | |
|---|---|---|---|
| 2009/0103640 A1* | 4/2009 | Chen et al. | 375/260 |
| 2011/0170442 A1* | 7/2011 | Lee et al. | 370/252 |

(Continued)

FOREIGN PATENT DOCUMENTS

| | | |
|---|---|---|
| JP | 2011-029686 A | 2/2011 |
| WO | 2012/011399 A1 | 1/2012 |

(Continued)

OTHER PUBLICATIONS
Official Communication issued in International Patent Application No. PCT/JP2012/077185, mailed on Nov. 20, 2012.

(Continued)

*Primary Examiner* — Dac Ha
(74) *Attorney, Agent, or Firm* — Keating & Bennett, LLP

(57) ABSTRACT

A receiver apparatus includes a first frequency response estimator configured to calculate a first frequency response estimation value using a reference signal, a duration extractor configured to determine an estimation duration by extracting at least one duration from among a plurality of duration candidates into which a predetermined maximum delay time is divided, and a second frequency response estimator configured to calculate a second frequency response estimation value as a frequency response estimation value for demodulation using the first frequency response and the estimation duration. The receiver apparatus thus performs high-precision channel estimation even if a variety of PDPs occur with time.

11 Claims, 16 Drawing Sheets

(56) References Cited

U.S. PATENT DOCUMENTS

2013/0182802 A1 7/2013 Kato et al.
2013/0308733 A1 11/2013 Kato et al.
2014/0286280 A1* 9/2014 Seo et al. ............... 370/329

FOREIGN PATENT DOCUMENTS

WO 2012/043072 A1 4/2012
WO 2012/105291 A1 8/2012

OTHER PUBLICATIONS

Sandell et al., "A comparative study of pilot-based channel estimators for wireless OFDM", Div. Signal Processing, Lulea Univ. Technology, Res. Rep. TULEA 1996, Sep. 19, 1996, 32 pages, Lulea, Sweden.

* cited by examiner

RECEIVER APPARATUS, RECEPTION METHOD, COMMUNICATION SYSTEM, AND COMMUNICATION METHOD

TECHNICAL FIELD

The present invention relates to a receiver apparatus, a reception method, a communication system, and a communication method.

BACKGROUND ART

In radio communication, particularly, in wideband transmission, there is a path that allows a radio wave to travel therethrough and arrives early. There is also a path that includes objects, such as buildings or mountains, which reflect and thus delay a radio wave in the arrival thereof. An environment where there are a plurality of paths is referred to as a multi-path environment. OFDM (Orthogonal Frequency Division Multiplexing) has recently gained attention as a method to implement high-speed and high-reliability transmission under the multi-path environment, and is adopted in a variety of fields including next generation mobile communication systems, radio LAN, and broadcasting. In a case that a receiver apparatus demodulates an OFDM signal, channel estimation is performed to calculate a channel frequency response (CFR) of a channel on each sub-carrier. To this end, in one method, a transmitter apparatus transmits to a receiver apparatus a pilot symbol. The waveform (or a signal sequence) of the pilot symbol is stored on the receiver apparatus. In order to perform high-precision channel estimation using the pilot symbol, accurate frequency correlation is needed.

Non Patent Literature 1 describes a technique of estimating a frequency response in accordance with MMSE (Minimum Mean Square Error) criterion in a standard pilot OFDM. More specifically, in accordance with Non Patent Literature 1, PDP (Power Delay Profile) is modeled, a frequency correlation is determined from the modeled PDP, and the channel estimation is performed on the MMSE criterion using the frequency response.

CITATION LIST

Non Patent Literature

NPL 1: M. Sandell and O. Edfors, "A comparative study of pilot-based channel estimators for wireless OFDM," Div. Signl Processing, Lulea Univ. Technology, Lulea, Sweden, Res. Rep. TULEA 1996: 19, Sep., 1996.

SUMMARY OF INVENTION

Technical Problem

Actual channel environment takes a variety of PDP depending on location and time. The technique described in Non Patent Literature 1 that fixes the model of the channel is subject to limitation in the improvement efforts of estimation accuracy. The present invention has been developed in view of the problem. It is an object of the present invention to provide a receiver apparatus that performs channel estimation accurately even when a variety of PDPs are taken depending on time.

Solution to Problem

A receiver apparatus of the present invention includes a first frequency response estimator configured to calculate a first frequency response estimation value using a reference signal, a duration extractor configured to determine an estimation duration by extracting at least one duration from among a plurality of duration candidates into which a predetermined maximum delay time is divided, and a second frequency response estimator configured to calculate a second frequency response estimation value as a frequency response estimation value for demodulation using the first frequency response and the estimation duration.

All the duration candidates may be equal to each other in duration length.

At least one of the duration candidates may be different in duration length from the remaining duration candidates.

A duration length of the duration candidate may be determined by a delay time of the duration candidate.

The duration extractor may include an approximate channel impulse response estimating unit configured to calculate an approximate channel impulse response by frequency-time transforming the first frequency response estimation value, a path extraction unit configured to extract a predetermined number of paths from paths forming the approximate channel impulse response, and a corresponding duration determining unit configured to determine as the estimation duration a duration of the path extracted from the duration candidates including the delay time.

The path extraction unit may extract the predetermined number of paths in accordance with power.

The path extraction unit may extract, from among paths forming the approximate channel impulse response, a path having power above a product of noise power and a predetermined value.

The corresponding duration determining unit may set an area of each duration of the estimation durations in accordance with power of a delay path used to determine the duration.

The duration extractor may include a plurality of path extraction units and a plurality of corresponding duration determining units with the number of path extraction units being equal to the number of corresponding duration determining units, a test frequency response estimating unit configured to calculate a plurality of test frequency response estimation values using the first frequency response and each estimation duration output by the corresponding duration determining unit, a channel match value calculation unit configured to calculate a channel match value of each of the test frequency response estimation values using the first frequency response, and a comparator configured to select an estimation duration to be used by the second frequency response estimator in accordance with the channel match value.

The duration extractor may further include a test frequency response estimating unit configured to combine the duration candidates to result in an estimation duration candidate, and configured to calculate a test frequency response estimation value from the estimation duration candidate and a channel match value calculation unit configured to calculate a channel match value from the test frequency response estimation value. The duration extractor may determine a plurality of estimation duration candidates, and calculate the estimation duration from the plurality of estimation duration candidates using the channel match value.

The duration extractor may repeat an iterative operation to select at least one duration candidate and determine the estimation duration. The test frequency response estimating unit may generate an estimation duration candidate by adding at least one of the duration candidates to the estimation duration determined in the immediately preceding iterative operation.

The duration extractor may include an unwanted duration candidate removal unit configured to remove the duration candidate that has been used to calculate a channel match value lower than a maximum channel match value among the channel match values calculated in the immediately preceding iterative operation, a determining unit configured to stop repeating the iterative operation in a case that the remaining number of duration candidates subsequent to the duration candidate removal is zero, and configured to determine, as an estimation duration to be used by the second frequency response estimator, the estimation duration determined in the immediately preceding iterative operation, and a duration determining unit configured to extract a predetermined number of channel match values in the order of from large to small, configured to set to a new estimation duration a value resulting from adding a duration candidate used to calculate the channel match value to the estimation duration determined in the immediately preceding iterative operation, and configured to cause a next iterative operation initiated by the test frequency response estimating unit to be performed with the new estimation duration.

The number of elements as the duration candidates determined by the duration determining unit in a single iterative operation may be one.

In a case that the number of channel match values subsequent to the duration candidate removal is a predetermined number other than 0 and 1, the determining unit may determine, as an estimation duration to be used by the second frequency response estimator, a new estimation duration resulting from adding an element of the duration candidate used to calculate the remaining channel match values to the estimation duration determined in the immediately preceding iterative operation.

The channel match value calculation unit may use as the channel match value a mean-squared error of the test frequency response estimation value and the first frequency response estimation value.

The channel match value calculation unit may use as the channel match value a cross correlation between the test frequency response estimation value and the first frequency response estimation value.

The channel match value calculation unit may use as the channel match value a value resulting from adding a model evidence, as a penalty, determined by a shape of the estimation duration used to calculate the test frequency response estimation value.

The channel match value calculation unit may use as the channel match value a value resulting from adding a penalty of the Bayesian information criterion.

The channel match value calculation unit may use as the channel match value a value resulting from adding a penalty of the Akaike's information criterion.

The present description contains the contents of the specification and/the drawings of Japanese Patent Application 2011-234091 which priority of the present patent application is based on.

Advantageous Effects of Invention

In accordance with the present invention, the channel estimation accuracy is greatly increased.

DESCRIPTION OF EMBODIMENTS

First Embodiment

Figure 1:
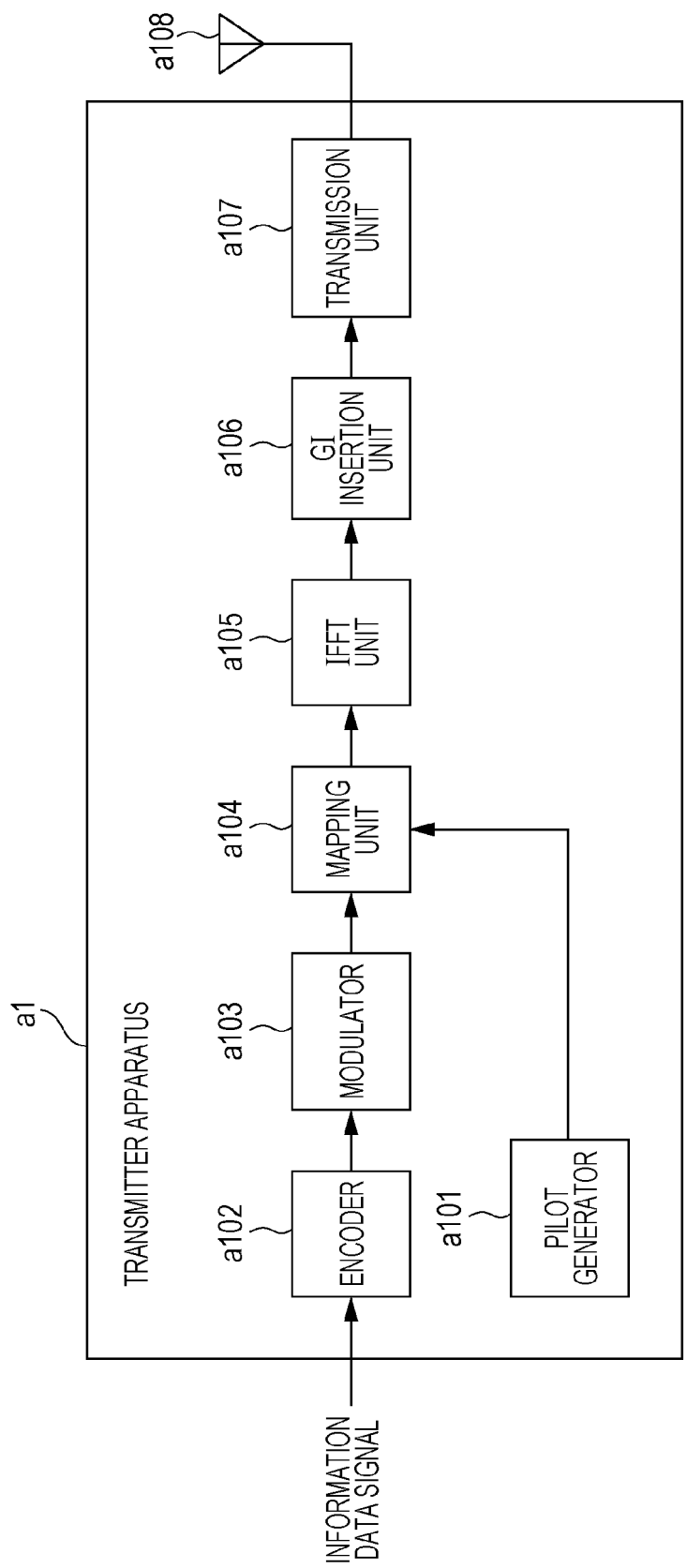
FIG. 1 is a block diagram diagrammatically illustrating a configuration of a transmitter apparatus of a first embodiment of the present invention.

FIG. 1 is a block diagram diagrammatically illustrating a configuration of a transmitter apparatus of a first embodiment of the present invention. In the embodiment, the transmitter apparatus a1 is used. As illustrated in FIG. 1, the transmitter apparatus a1 includes a pilot generator a101, an encoder a102, a modulator a103, a mapping unit a104, an IFFT (Inverse Fast Fourier Transform) unit a105, a GI insertion unit a106, a transmission unit a107, and a transmit antenna a108. The transmitter apparatus a1 transmits an OFDM signal.

The pilot generator a101 generates a pilot symbol. An amplitude value of a waveform (or a signal sequence) of the pilot symbol is pre-stored on a receiver apparatus. The pilot generator a101 outputs the pilot symbol to the mapping unit a104. In the discussion of the present embodiment, a receiver apparatus b1 is used as the receiver apparatus. The receiver apparatus b1 performs channel estimation with the pilot symbol handled as a reference signal.

The encoder a102 encodes information bits to be transmitted to the receiver apparatus b1 using error correction code, such as convolutional code, Turbo code, LDPC (Low Density Parity Check) code, thereby generating encoded bits. The encoder a102 outputs the generated encoded bits to the modulator a103.

The modulator a103 modulates the encoded bits input from the encoder a102 using a modulation scheme, such as PSK (Phase Shift Keying) or QAM (Quadrature Amplitude Modulation), thereby generating a modulation symbol. The modulator a103 outputs the generated modulation symbol to the mapping unit a104.

Figure 2:
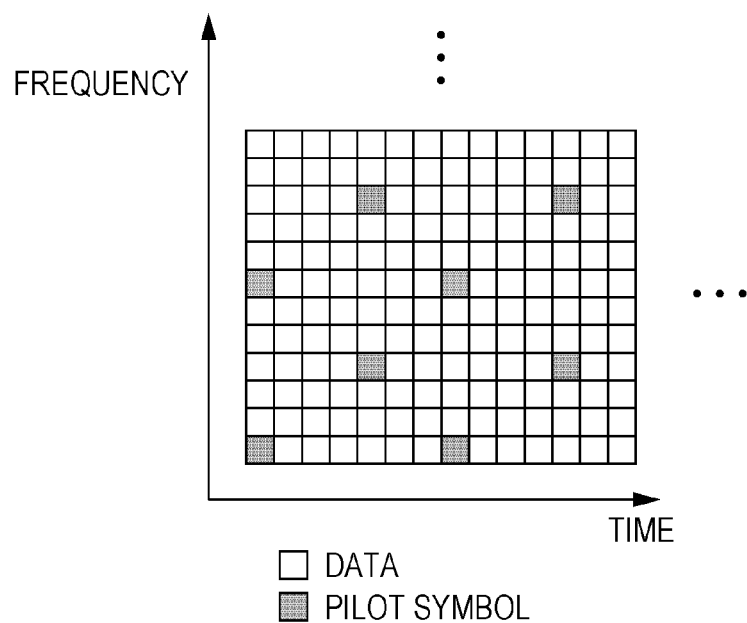
FIG. 2 illustrates a mapping example in which a mapping unit a104 maps a pilot symbol to a modulation signal.
Figure 3:
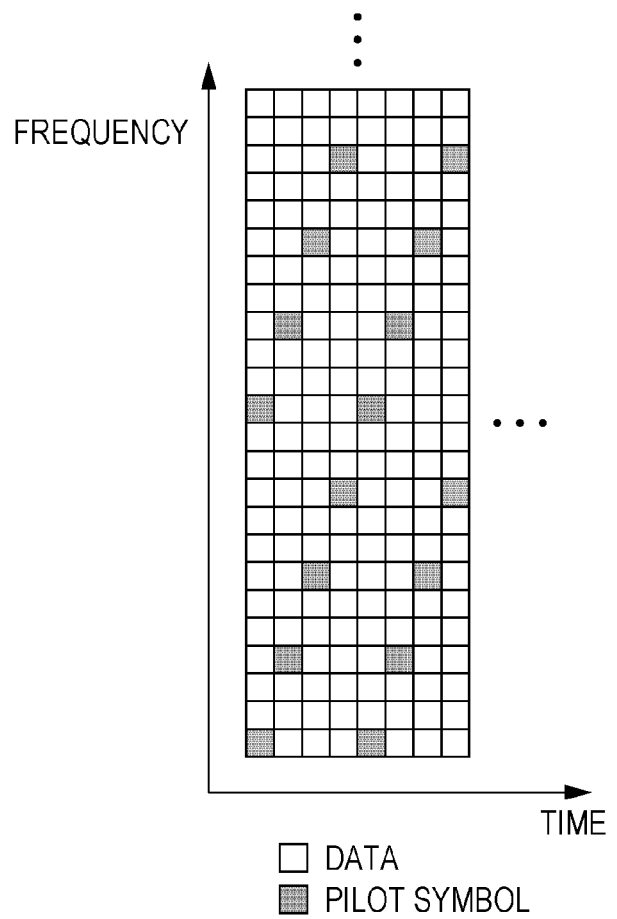
FIG. 3 illustrates another mapping example in which the mapping unit a104 maps the pilot symbol to the modulation signal.

The mapping unit a104 maps the pilot symbol input from the pilot generator a101 and the modulation symbol input from the modulator a103 to a resource element (time-frequency band) in accordance with predetermined mapping information, thereby generating a signal in the frequency domain. The mapping unit a104 outputs the signal in the frequency domain to the IFFT unit a105. The resource element herein refers to a unit according to which the modulation symbol is located. The modulation symbol includes a single subcarrier and an FFT (Fast Fourier Transform) duration to be discussed later in a frame that the transmitter apparatus a1 is to transmit. The mapping information is determined by the transmitter apparatus a1, and the transmitter apparatus a1 then notifies the receiver apparatus b1 of the mapping information in advance. In a receiver apparatus for broadcasting in such a system that does not involve notification, no notification is performed. FIG. 2 illustrates an example of mapping in which the mapping unit a104 maps the pilot symbol to a modulation signal. FIG. 2 illustrates a pilot arrangement in LTE (Long Term Evolution) as the 3.9 generation mobile communication system. FIG. 3 illustrates another mapping example, and thus illustrates a pilot arrangement of ISDB-T of Japanese digital terrestrial television broadcasting.

The IFFT unit a105 frequency-time transforms the signal in the frequency domain input from the mapping unit a104, thereby generating a signal in the time domain. Here, unit time duration of IFFT is referred to as an FFT duration. The IFFT unit a105 outputs the signal in the time domain to the GI insertion unit a106.

The GI insertion unit a106 attaches a GI (guard interval) to the signal in the time domain input from the IFFT unit a105 on each signal of the FFT duration. The guard interval herein is a known signal, such as a Cyclic Prefix (CP) as a copy of part of a back portion of the signal of the FFT duration, zero padding including consecutive zero durations, or Golay code. The GI insertion unit a106 attaches such a signal to the front of the signal of the FFT duration.

The FFT duration and a time duration of the GI (referred to as a GI duration) that is attached to the signal in the time domain by the GI insertion unit a106 are together referred to as an OFDM symbol duration. A signal during the OFDM symbol duration is referred to as an OFDM symbol. The GI insertion unit a106 outputs the signal with the GI attached thereto to the transmission unit a107.

The GI may be attached to the back end of the FFT duration. For example, if the cyclic prefix is used, the copy of part of the front portion of the FFT duration is attached to the back end of the signal of the FFT duration. With the cyclic prefix used, it is sufficient if periodicity is maintained among the OFDM symbol durations, and the preceding operation is not applicable.

The transmission unit a107 digital-to-analog converts a signal input from the GI insertion unit a106, and wave-shapes the resulting analog signal. The transmission unit a107 up-converts the wave-shaped signal from a baseband to a radio frequency band, and then transmits the resulting signal in the radio frequency band from the transmit antenna a108 to the receiver apparatus b1.

Figure 4:
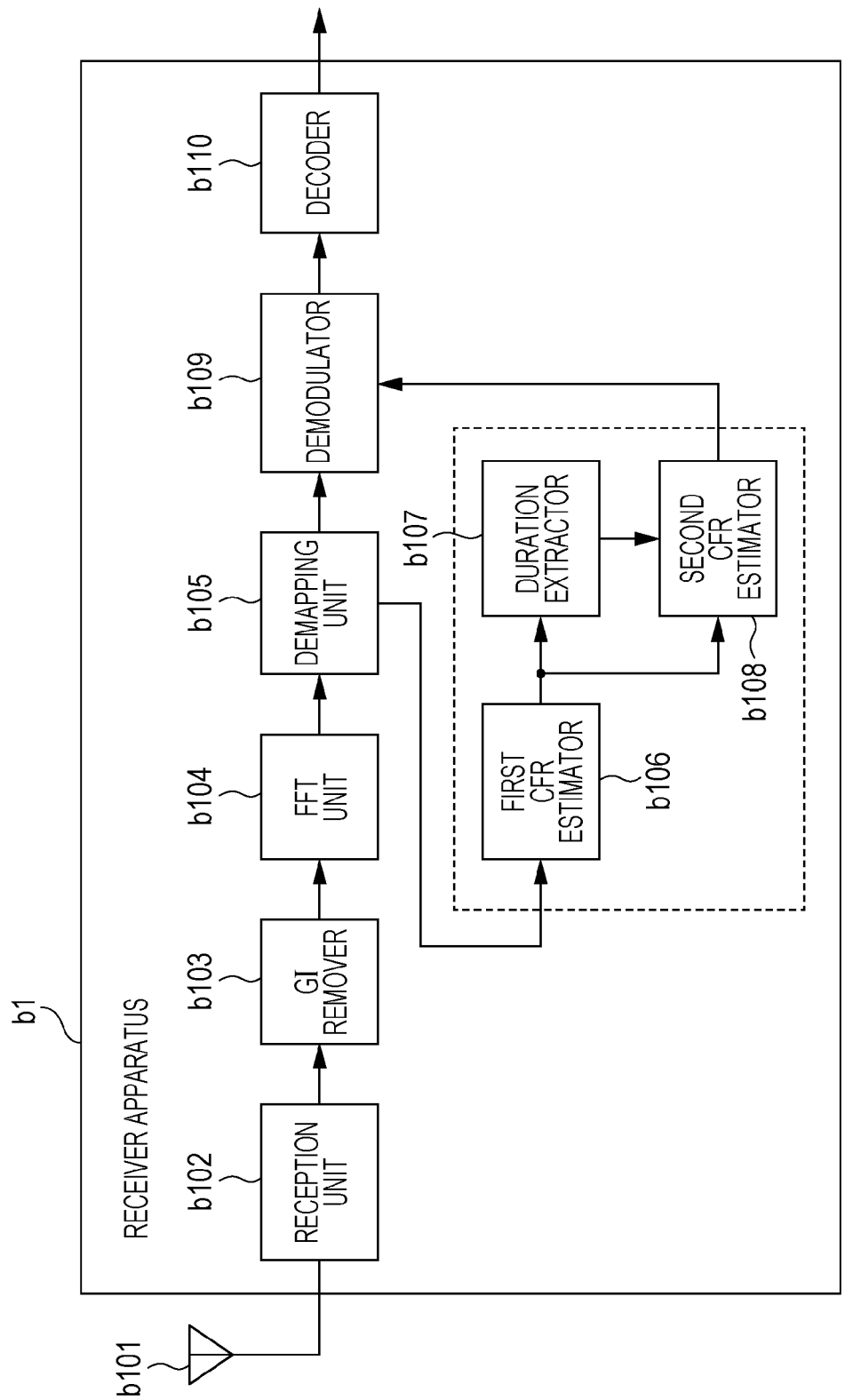
FIG. 4 is a block diagram diagrammatically illustrating a configuration of a receiver apparatus of the first embodiment of the present invention.

FIG. 4 is a block diagram illustrating a configuration of the receiver apparatus b1 of the present embodiment. As illustrated in FIG. 4, the receiver apparatus b1 includes a receive antenna b101, a reception unit b102, a GI remover b103, an FFT unit b104, a demapping unit b105, a first CFR estimator b106, a duration extractor b107, a second CFR estimator b108, a demodulator b109, and a decoder b110. As illustrated in FIG. 4, a channel estimator in a broken-line box includes the first CFR estimator b106, the duration extractor b107, and the second CFR estimator b108. A first CFR estimation value indicates an estimation value of CFR in response to the pilot signal in a pilot subcarrier. A second CFR estimation value indicates a CFR estimation value for use in demodulation on which noise reduction and interpolation on subcarriers other than the pilot subcarrier have been performed using the first CFR estimation value.

The reception unit b102 receives a transmission signal transmitted from the transmitter apparatus a1 via the receive antenna b101. The reception unit b102 performs a frequency conversion operation and an analog-to-digital conversion operation on the reception signal.

The GI remover b103 removes the guard interval from the reception signal input from the reception unit b102, and then outputs the resulting signal to the FFT unit b104.

The FFT unit b104 time-frequency transforms the signal in the time domain input from the GI remover b103, and outputs to the demapping unit b105 the transformed signal in the frequency domain.

The demapping unit b105 demaps the input signal in accordance with demapping information which the transmitter apparatus a1 has notified in advance, and outputs to the first CFR estimator b106 a reception signal of a subcarrier along which the separated pilot symbol has been transmitted. The demapping unit b105 also outputs to the demodulator b109 a reception signal of a subcarrier along which data has been transmitted.

The first CFR estimator calculates the first CFR estimation value using a pilot symbol in the pilot subcarrier, and outputs the first CFR estimation value to the duration extractor b107 and the second CFR estimator b108.

Figure 5:
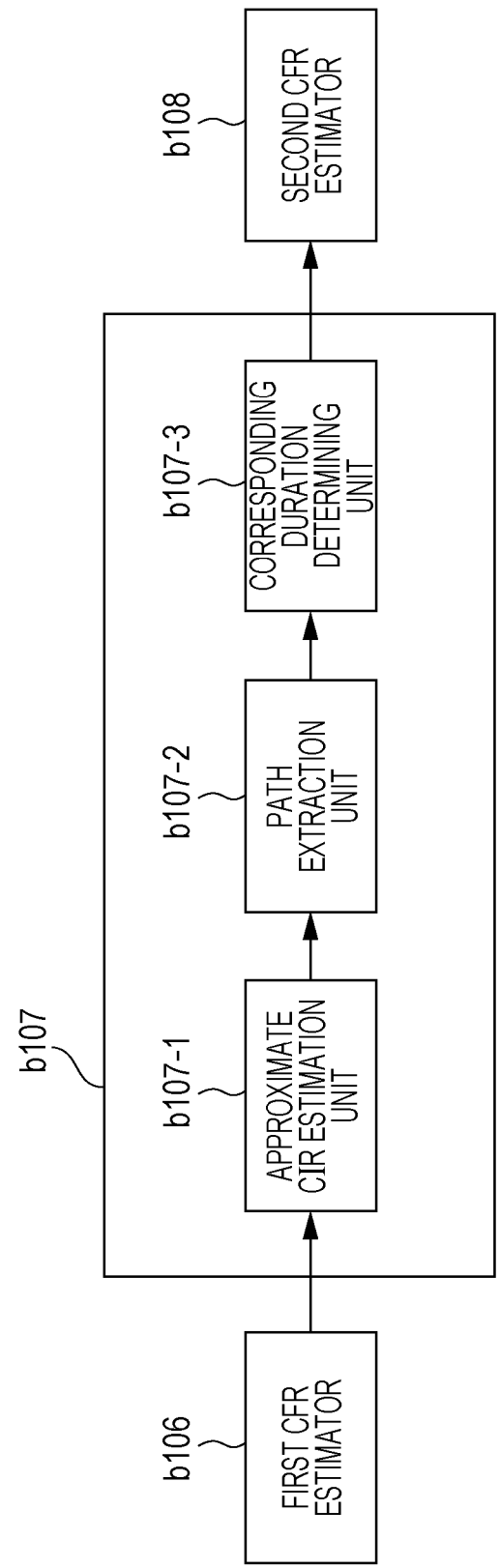
FIG. 5 is a block diagram diagrammatically illustrating a configuration of a duration extractor b107.

FIG. 5 is a block diagram diagrammatically illustrating a configuration of the duration extractor b107. The duration extractor b107 includes an approximate CIR (Channel Impulse Response) estimation unit b107-1, a path extraction unit b107-2, and a corresponding duration determining unit b107-3.

The approximate CIR estimation unit b107-1 performs discrete frequency-time transform, such as IFFT, on the first CFR estimation value input from the first CFR estimator b106, thereby converting the first CFR estimation value into an approximate CIR estimation value. The approximate CIR estimation unit b107-1 outputs the calculated approximate CIR estimation value to the path extraction unit b107-2.

The path extraction unit b107-2 extracts a path having high power using the approximate CIR estimation value input from the approximate CIR estimation unit b107-1. The path extraction unit b107-2 outputs information about the extracted path to the corresponding duration determining unit b107-3.

The corresponding duration determining unit b107-3 determines a duration corresponding to the path input from the path extraction unit b107-2 to be an estimation duration. The corresponding duration determining unit b107-3 outputs the determined estimation duration to the second CFR estimator b108.

The second CFR estimator b108 calculates the second CFR estimation value using the estimation duration input from the corresponding duration determining unit b107-3. More specifically, the second CFR estimator b108 determines a frequency correlation from the shape of the estimation duration, calculates a filter coefficient of MMSE (Minimum Mean Square Error) criterion, and thus calculates the second CFR estimation value by filtering the first CFR estimation value through the filter coefficient.

The demodulator b109 calculates a filter coefficient, such as ZF (Zero Forcing) criterion, MMSE (Minimum Mean Square Error) criterion, using the frequency response input from the channel estimator b106. Using the calculated filter coefficient, the demodulator b109 performs compensation for variations in the amplitude and phase of a signal (referred to as channel compensation). The demodulator b109 outputs a bit Log Likelihood Ratio (LLR) as demodulation results to the decoder b110.

The decoder b110 performs a decoding process on a demodulation symbol input from the demodulator b109 using, for example, Maximum Likelihood Detection (MLD), Maximum A posteriori Probability (MAP), log-MAP, Max-log-MAP, SOVA (Soft Output Viterbi Algorithm), or the like.

Operation Principle

The operation principle of the receiver apparatus b1 is described with reference to FIG. 4.

A signal r(t) at time t received by the reception unit b102 is represented using the following Equations (1)-(3):

[Math. 1]

$$r(t) = \int_0^D h(t, \tau)s(t - \tau)d\tau + z(t) \quad (1)$$

$$s(t) = \sum_{i=0}^{\infty} s_i(t) \quad (2)$$

$$s_i(t) = \frac{1}{\sqrt{N}} \sum_{n=0}^{N-1} S_{i,n} \exp[j2\pi n\Delta_f(t - T_s - T_G)] \quad (3)$$

for $$iT_s \le t < (i+1)T_s$$

Here, D represents a maximum delay time, h(t,τ) represents a complex amplitude of delay time τ at time t, s(t) represents a transmission signal, z(t) represents noise, $s_i(t)$ represents a transmission signal of only an i-th symbol, N represents the number of FFT points, $S_{i,n}$ represents a modulation signal of an n-th subcarrier of the i-th symbol, $T_G$ represents a guard interval length, $T_s$ represents the length of the OFDM symbol, and $\Delta_f$ represents a frequency interval between subcarriers. Complex amplitudes h(t,τ) of τ=0 to D are collectively referred to as a channel impulse response at time t. Note that modeling is performed on the assumption that the transmission signal and preceding waves of the reception signal are synchronized.

Figure 6:
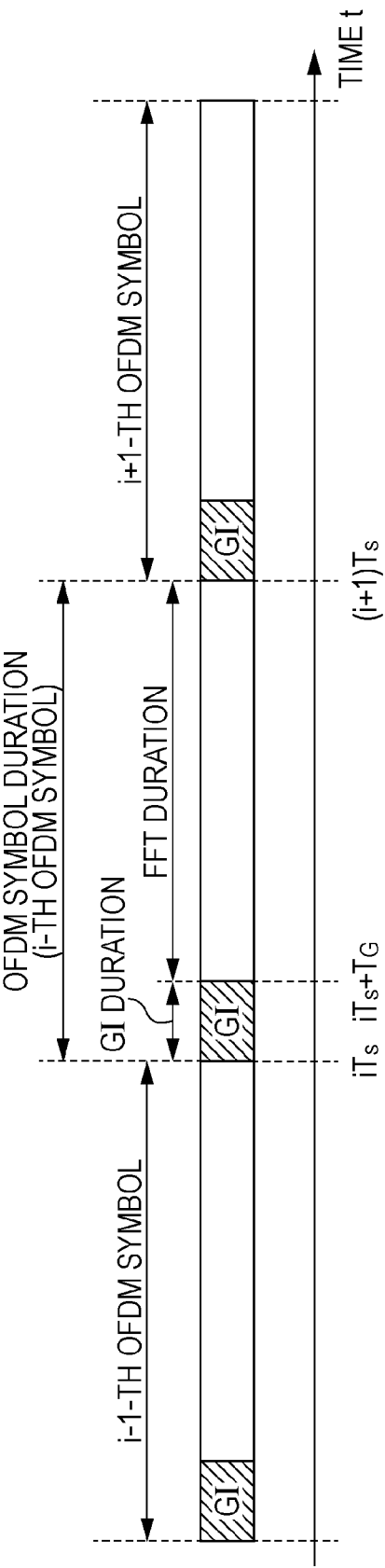
FIG. 6 illustrates a transmission signal $s_i(t)$ of an i-th symbol.

FIG. 6 illustrates the structure of a transmission signal $s_i(t)$ of an i-th symbol. The transmission signal s(t) includes OFDM symbols arranged one by one in time sequence.

Figure 7:
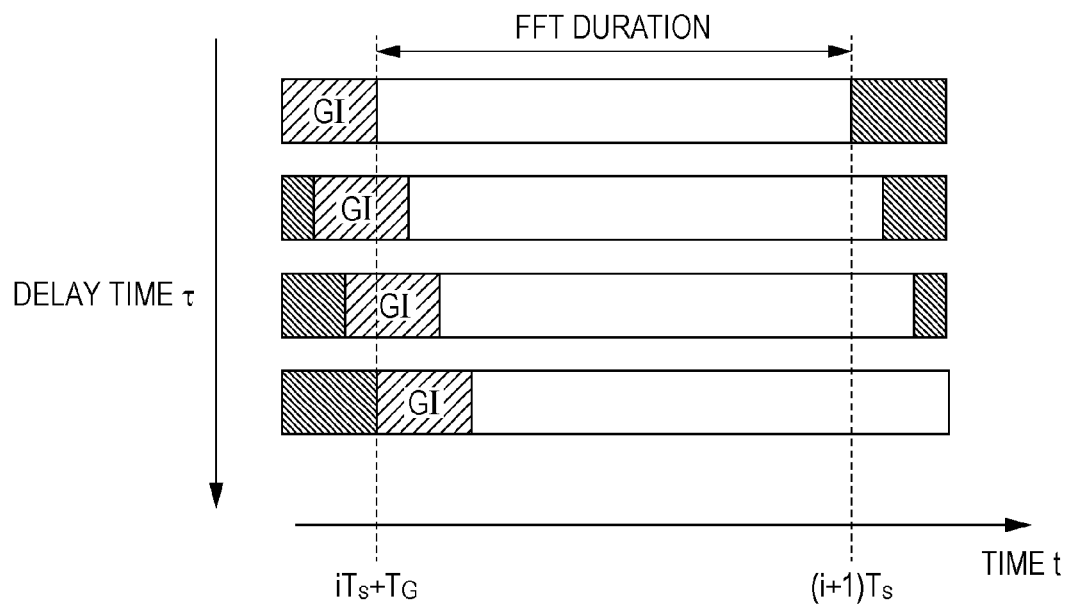
FIG. 7 illustrates a structure of a reception signal near the i-th symbol.

FIG. 7 illustrates a structure of a reception signal near the i-th symbol. For simplicity of explanation, only the preceding waves and three delayed pulses arrive in the illustrated example. In practice, as modeled in accordance with Equation (1), the delayed pulses arrive successively.

Now, demodulation and decoding of the i-th symbol are considered. The reception unit b102 acquires a reception signal in a digital region, and the GI remover b103 removes GI from the reception signal, and the FFT unit b104 time-frequency transforms the reception signal. A reception signal $R_{i,n}$ of an n-th subcarrier of the i-th symbol obtained as a result is represented by the following Equations (4) and (5):

[Math. 2]

$$R_{i,n} = \frac{1}{\sqrt{N}} \sum_{k=N_g}^{N_g+N-1} r(iT_s + k\Delta_t)\exp\left[-j\frac{2\pi n}{N}(k - N_g)\right] \quad (4)$$

$$= H_{i,n}S_{i,n} + Z_{i,n}$$

$$H_{i,n} = \int_0^D c_i(\tau)\exp(-j2\pi n\Delta_f\tau) \quad (5)$$

Here, $H_{i,n}$ represents CFR of the n-th subcarrier of the i-th symbol, $Z_{i,n}$ represents noise of the n-th subcarrier of the i-th symbol, $\Delta_t$ represents a sampling frequency of the digital signal and has a relationship of $\Delta_t=1/N\Delta_f$. Modeling is performed on the assumption that h(t,τ) remains fixed to $c_i(\tau)$ within $iT_s \le t < (i+1)T_s$, and that D is less than $T_G$. For this reason, any interference other than noise occurs.

The function of the receiver apparatus b1 other than the channel estimation is described on the assumption that a second CFR estimation value $H''_{i,n}$ as an estimation value of $H_{i,n}$ for use in demodulation has been obtained. The operation principle of the channel estimator configured to estimate $H''_{i,n}$ is described later.

The demodulator b109 calculates a demodulation symbol $S'_{i,n}$ with filtering of MMSE criterion applied, using accordance with Equation (6).

[Math. 3]

$$S'_{i,n} = \frac{H''^*_{i,n}}{H''^*_{i,n}H''_{i,n} + \sigma_z^2}R_{i,n} \quad (6)$$

Y* represents the complex conjugate of Y. In Equation (6), $\sigma_z^2$ in Equation (6) represents power of $Z_{i,n}$ and is estimated using a replica $S''_{i,n}$ of $S_{i,n}$ obtained from demodulation results, in accordance with the following Equation (7).

[Math. 4]

$$\sigma_z^2 = \frac{1}{N}\sum_{n=0}^{N-1} |R_{i,n} - H''_{i,n}S''_{i,n}|^2 \quad (7)$$

However, if not all N subcarriers are used, the number of subcarriers for use in averaging may be adjusted. This operation may be performed on the symbols that has undergone decoding. Averaging is not only performed in terms of subcarrier as in Equation (7), but also averaging may be performed in terms of symbol (averaging with respect to i). In such a case, weighted averaging operation may be performed in a manner such that the older the results are, the more they are forgotten. A soft replica produced using output results of the decoder b110 may be used as $S''_{i,n}$, or a hard replica resulting from performing a hard decision on the soft replica may be used as $S''_{i,n}$. Demodulation result $S'_{i,n}$ may be used as is instead of the decoding result. A hard replica resulting from performing a hard decision on the demodulation result $S'_{i,n}$ may be used. In a case of a pilot symbol, the pilot symbol may be used as is.

The demodulator b109 calculates a bit log likelihood ratio from the demodulation result $S'_{i,n}$ of Equation (6). Equivalent amplitude gain may be used in this calculation process. More specifically, in a case of QPSK, Equation (8) represents a equivalent amplitude gain $\mu_{i,n}$ of the n-th subcarrier of the i-th symbol and Equations (9) and (10) represent the bit log likelihood ratio λ. Equations (9) and (10) respectively represent the bit log likelihood ratios $\lambda(b_{i,n,0})$ and $\lambda(b_{i,n,1})$ of a first bit and a second bit $b_{i,n,1}$.

[Math. 5]

$$\mu_{i,n} = \frac{H''^*_{i,n} H''_{i,n}}{H''^*_{i,n} H''_{i,n} + \sigma_z^2} \quad (8)$$

$$\lambda(b_{i,n,0}) = \frac{4\text{Re}[S'_{i,n}]}{\sqrt{2}(1-\mu_{i,n})} \quad (9)$$

$$\lambda(b_{i,n,1}) = \frac{4\text{Im}[S'_{i,n}]}{\sqrt{2}(1-\mu_{i,n})} \quad (10)$$

The channel estimation operation is described with reference to FIG. 4 and FIG. 5. The first CFR estimator b106 calculates the first CFR estimation value $H'_{i,n}$ in accordance with Equation (11).

[Math. 6]

$$H'_{i,n} = \frac{R_{i,n}}{S_{i,n}} \quad (11)$$

To perform this calculation, the signal $S_{i,n}$ of the n-th subcarrier needs to be known, but it is sufficient if the pilot symbol is used in the pilot subcarrier. As described with reference to the estimation of the noise power, Equation (11) may be calculated using the symbol having undergone demodulation or decoding without the need for the pilot subcarrier. The estimation values $H'_{i,n}$ may be increased to calculate the estimation value $H''_{i,n}$. In the following discussion, only the pilot subcarrier is used.

In the calculation method described below, the second CFR estimator b108 calculates the second CFR estimation value using the first CFR estimation value and the second CFR estimation value obtained by the duration extractor b107 to be described later. Let $n_i(0), n_i(1), \ldots,$ and $n_i(P_i-1)$ represent pilot subcarriers of the i-th symbol applicable to Equation (11). A vector $H_{i,p}$ (H is a bold letter) as a row of first CFR estimation values of the subcarriers is defined by the following Equation (12).

[Math. 7]

$$H_{i,p} = (H'_{i,n_i(0)} H'_{i,n_i(1)} \ldots H'_{i,n_i(P_i-1)})^T \quad (12)$$

$P_i$ represents the number of pilot symbols in the i-th symbol, and the bold letter represents a vector or a matrix, and $Y^T$ (Y is a bold letter) is the transposed matrix of Y (Y is a bold letter). Considering the pilot subcarriers of the first OFDM symbol of FIG. 2, $n_i(0)$ is the lowest frequency subcarrier, $n_i(1)$ is located higher than the lowest frequency by six subcarriers along the frequency axis, and $n_i(2)$ is located higher than the lowest subcarrier by another six subcarriers along the frequency axis, and so on. The estimation value is obtained by simply dividing by the pilot symbol. Since the effect of noise is large, the noise is preferably reduced using a statistical property of the channel. The CFR is not determined on subcarriers other than the pilot subcarriers, and thus determined through interpolating using the same statistical property of the channel. More specifically, a frequency correlation is used as the statistical property of the channel, and that frequency correlation is calculated based on the shape of the estimation duration.

To perform the estimation using the MMSE criterion, a vector $H_i$ (H is a bold letter) having as an element the second CFR estimation value is represented by the following equations (13) through (15).

[Math. 8]

$$H_i = (H''_{i,0} \; H''_{i,1} \; \ldots \; H''_{i,N-1})^T \quad (13)$$
$$= R_{H_i H_{i,p}} (R_{H_{i,p} H_{i,p}} + \sigma_z^2 I_{P_i})^{-1} H_{i,p}$$

$$R_{H_i H_{i,p}} = \begin{pmatrix} \rho_{0,n_i(0)} & \rho_{0,n_i(1)} & \cdots & \rho_{0,n_i(P_i-1)} \\ \rho_{1,n_i(0)} & \rho_{1,n_i(1)} & \cdots & \rho_{1,n_i(P_i-1)} \\ \vdots & \vdots & \ddots & \vdots \\ \rho_{N-1,n_i(0)} & \rho_{N-1,n_i(1)} & \cdots & \rho_{N-1,n_i(P_i-1)} \end{pmatrix} \quad (14)$$

$$R_{H_{i,p} H_{i,p}} = \begin{pmatrix} \rho_{n_i(0),n_i(0)} & \rho_{n_i(0),n_i(1)} & \cdots & \rho_{n_i(0),n_i(P_i-1)} \\ \rho_{n_i(1),n_i(0)} & \rho_{n_i(1),n_i(1)} & \cdots & \rho_{n_i(1),n_i(P_i-1)} \\ \vdots & \vdots & \ddots & \vdots \\ \rho_{n_i(P_i-1),n_i(0)} & \rho_{n_i(P_i-1),n_i(1)} & \cdots & \rho_{n_i(P_i-1),n_i(P_i-1)} \end{pmatrix} \quad (15)$$

Here, $R_{H_i H_{i,p}}$ (R is a bold letter) is a cross-correlation matrix of $H_i$ (H is a bold letter) and $H_{i,p}$ (H is a bold letter), $R_{H_{i,p} H_{i,p}}$ (R is a bold letter) is an autocorrelation matrix of $H_{i,p}$ (H is a bold letter), and $\rho_{n,m}$ is a correlation coefficient between the subcarriers n and m. $\rho_{n,m}$ is represented by the following equation (16).

[Math. 9]

$$\rho_{n,m} = \int_0^D E[|c_i(\tau)|^2] \exp[-j2\pi(n-m)\Delta_f \tau] d\tau \quad (16)$$

Figure 8:
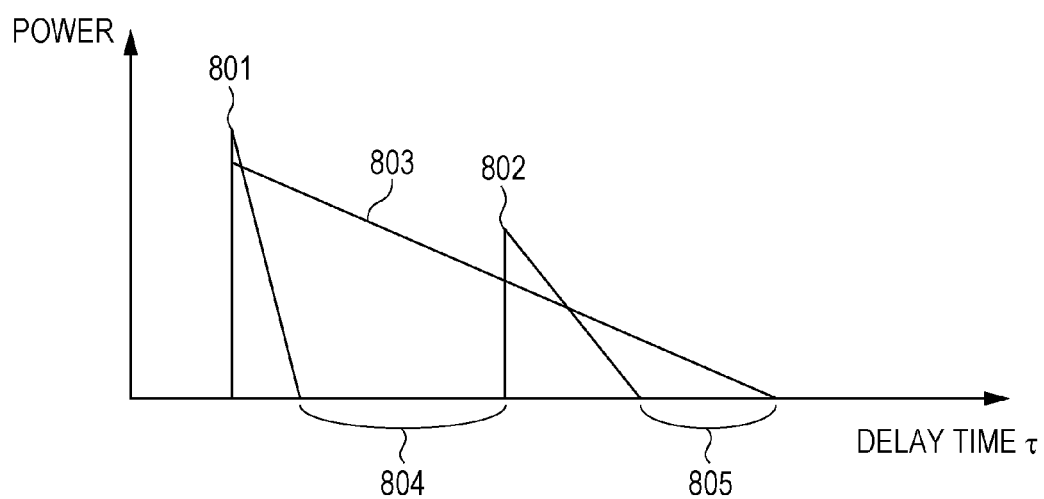
FIG. 8 illustrates how an estimation accuracy decreases if a discrepancy between a delay profile and a model thereof is large in a reception signal actually observed by a receiver apparatus b1.

E[x] here represents an ensemble average of x. $E[|c_i(\tau)|^2]$ represents a delay profile, and is typically unknown. Equation (16) is difficult to calculate in this form. The technique disclosed in NPL 1 allows Equation (16) to be calculated by modeling the delay profile. If a discrepancy between the delay profile and the mode thereof is large with the receiver apparatus b1 observing the reception signal, the estimation accuracy is lowered. FIG. 8 illustrates such a case. Plots 801 and 802 represent power of the reception signals actually received, and plot 803 represents power of an assumed model. In such a case, no delay path is present in durations 804 and 805, and if zeroes are assumed during these durations, the estimation accuracy is increased.

Figure 9:
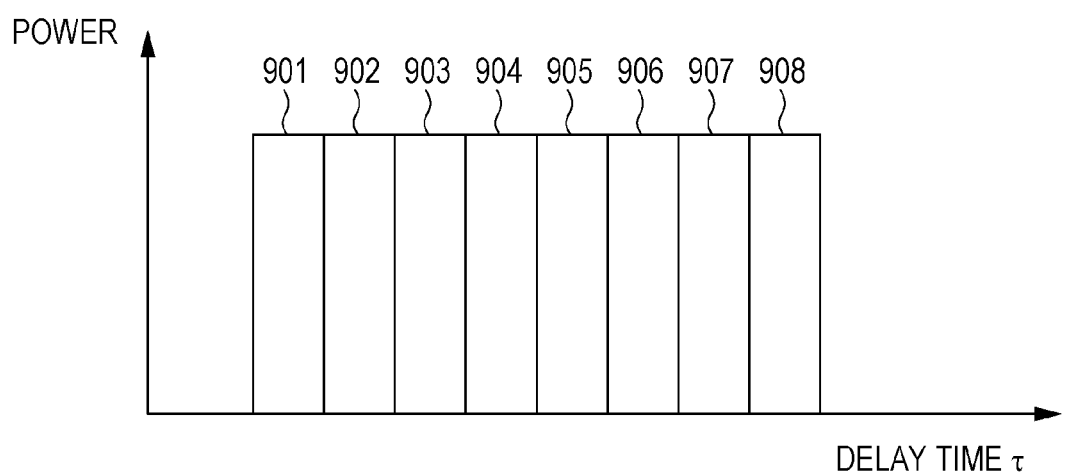
FIG. 9 illustrates an example of eight duration candidates 901 through 908 prepared.
Figure 10:
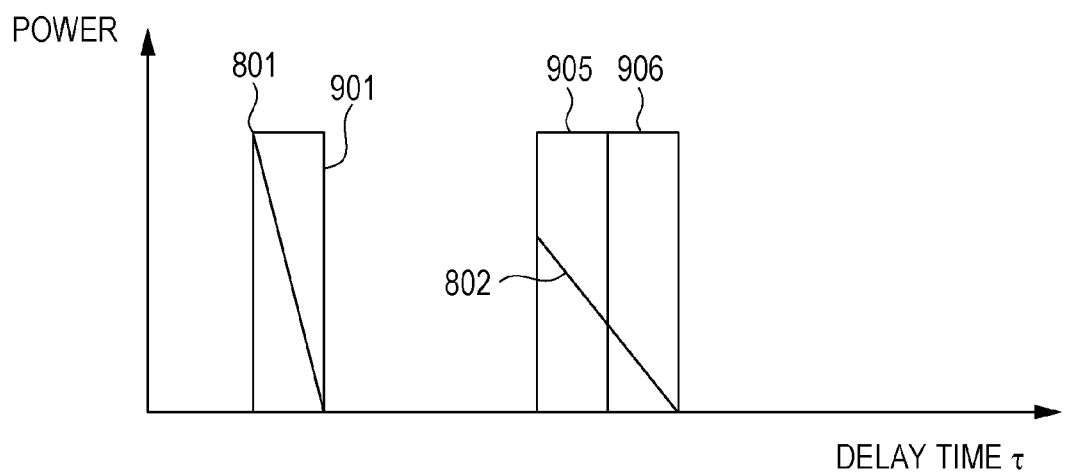
FIG. 10 illustrates a duration candidate relationship in which several duration candidates are selected to estimate a channel.

To embody such a profile, a plurality of duration candidates is prepared, and the selection method of these duration candidates is varied to search for a duration resulting in a high estimation accuracy. FIG. 9 illustrates eight duration candidates 901 through 908 prepared. Several duration candidates are selected from these duration candidates. If duration candidates 901, 905, and 906 are selected, the estimation of the channel of FIG. 8 results in the relationship of FIG. 10. The relationship of FIG. 10 is most similar to the actual channels 801 and 802. Increased estimation accuracy thus results. In accordance with the present embodiment, the duration resulting from combining the duration candidates of FIG. 10 is referred to as the estimation duration.

Let K represent the number of duration candidates, $\Delta_k$ represent the width of a duration candidate k, $\alpha_k$ represent the size of the duration candidate k, and $\tau_k$ represent a delay time at the start position of the duration candidate k, and Equation (16) is re-written as the following Equations (17) and (18).

[Math. 10]

$$\rho_{n,m} = \sum_{k \in \Phi} \alpha_k \exp\left[-j2\pi(n-m)\Delta_f\left(\tau_k + \frac{1}{2}\Delta_k\right)\right] \Delta_k \operatorname{sinc}[(n-m)\Delta_f \Delta_k] \quad (17)$$

$$\tau_k = \sum_{k'=0}^{k-1} \Delta_{k'} \quad (18)$$

Here, sinc(x) is a function that is 1 with x=0, and sin($\pi$x)/($\pi$x) with x being a value other than 0. $\Phi$ to in Equation (17) is a set of numbers in selected duration candidates. $\Delta_k$ may be a fixed value regardless of k. For example, $\Delta_k$ may be $\Delta_t$ or $2\Delta_t$. Generally, since the delay profile tends to expand in a larger delay time region, $\Delta_k$ may be set to be larger in the larger delay time region. The following discussion is based on the assumption that $\Delta_k$ is equal to $\Delta_t$. As for a specific value of K, a combination of K and $\Delta_k$ is set up so that $\tau_k$ becomes as large as about $T_G$ based on the assumption that there is not any delay wave longer than GI. A larger K may be set up based on the assumption that there is a longer delay wave. $\alpha_k$ may be simply set to be a fixed value, for example, to $0.5/\Delta_k$.

An extraction method of the estimation duration performed by the duration extractor b107 of the present embodiment is described with reference to FIG. 5. The duration extractor b107 learns the shape of the delay profile by performing IFFT transform on the first CFR estimation value. The following Equations (19) and (20) express $c'_i$ (c is a bold letter) representing the IFFT transform result of $H_{i,p}$ (H is a bold letter).

[Math. 11]

$$c'_i = F^H H_{i,p} \quad (19)$$

$$F^H = \begin{pmatrix} 1 & 1 & \cdots & 1 \\ \exp\left(j\frac{2\pi n_i(0)}{N}1\right) & \exp\left(j\frac{2\pi n_i(1)}{N}1\right) & \cdots & \exp\left(j\frac{2\pi n_i(P_i)}{N}1\right) \\ \vdots & \vdots & \ddots & \vdots \\ \exp\left(j\frac{2\pi n_i(0)}{N}(L-1)\right) & \exp\left(j\frac{2\pi n_i(1)}{N}(L-1)\right) & \cdots & \exp\left(j\frac{2\pi n_i(P_i)}{N}(L-1)\right) \end{pmatrix} \quad (20)$$

Figure 11:
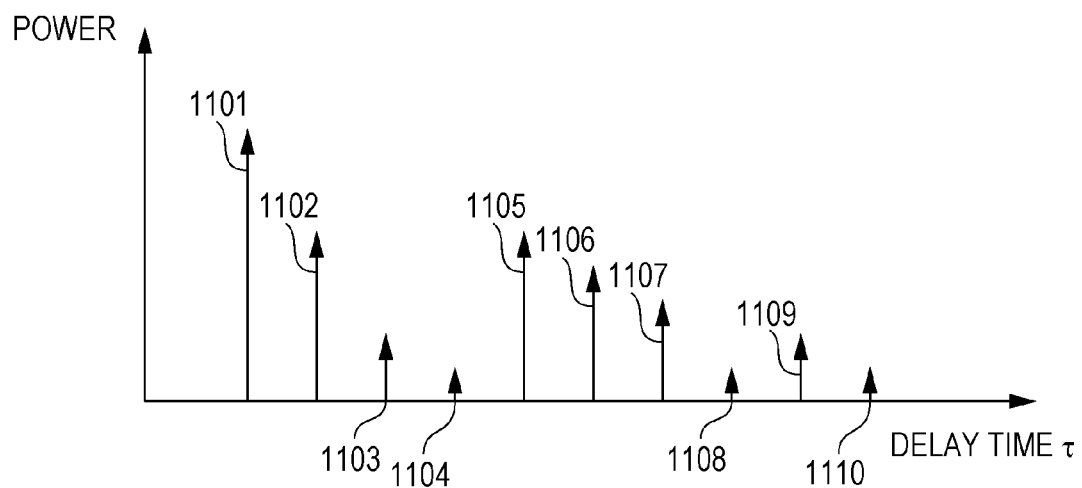
FIG. 11 illustrates power of a path based on the assumption that a channel impulse response is discrete.

Here, L represents a maximum delayed discrete time observed, and the relationship $L\Delta_t > D$ holds. FIG. 11 illustrates power of $c'_i$ (c is a bold letter). FIG. 11 illustrates paths 1101 through 1110 based on the assumption that the channel impulse response is discrete. This may be interpreted to mean that the paths 1101 through 1110 approximately represent the shape of the delay profile. Of the power of $c'_i$ (c is a bold letter), a predetermined number of paths in the order from large to small power are extracted. This operation is performed by the path extraction unit b107-2. For example, if five paths are extracted as illustrated in FIG. 11, paths 1101, 1102, 1105, 1106, and 1107 are extracted. The number of paths to be extracted may be determined in the design phase of the receiver apparatus b1 or may be set to be variable and then updated when firmware or software of the receiver apparatus b1 is updated.

Figure 12:
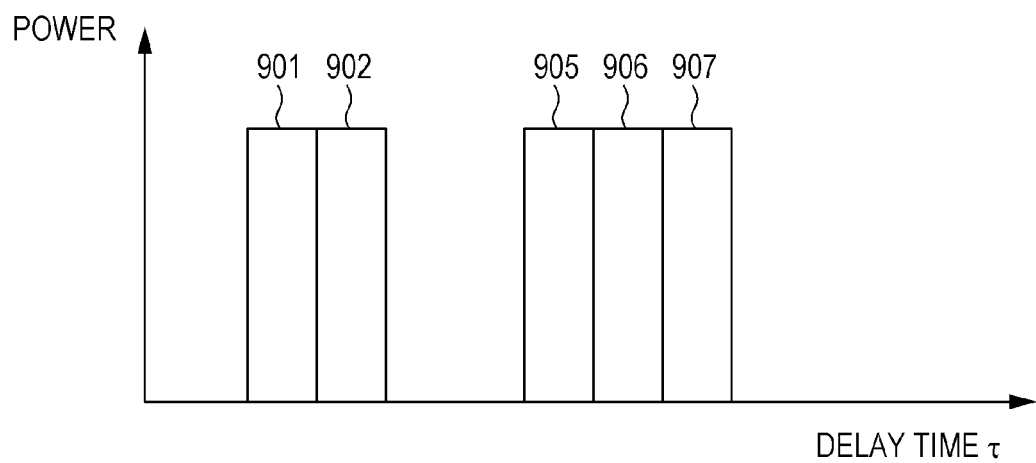
FIG. 12 illustrates an estimation duration of an extracted path.
Figure 13:
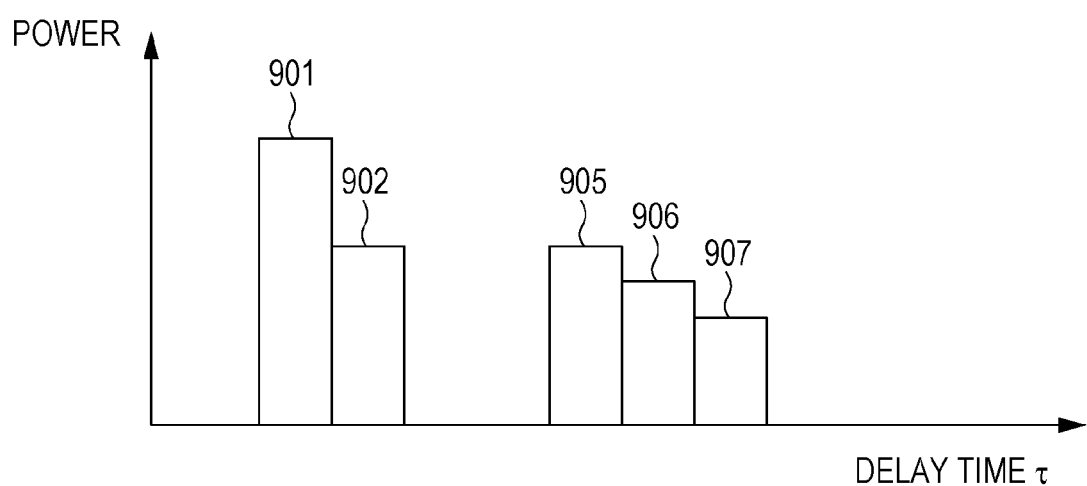
FIG. 13 illustrate an estimation duration of the extracted path in a case that a k-th element is set to be an area of a k-th duration.

The estimation duration is determined based on the extracted paths. More specifically, the path of a k-th element is extracted from $c'_i$ (c is a bold letter), and a corresponding duration for use in the estimation is a duration $k\Delta_t \leq \tau \leq (k+1)\Delta_t$. FIG. 12 illustrates estimation durations in a case that paths 1101, 1102, 1105, 1106, and 1107 are extracted in FIG. 11. As FIG. 10, FIG. 12 illustrates the estimation durations numbered in the same way as in FIG. 9. The estimation durations 901, 902, 905, 906, and 907 of FIG. 12 correspond to the paths 1101, 1102, 1105, 1106, and 1107 of FIG. 11. Note that an area of a k-th duration may be set to be a k-th element of $c'_i$ (c is a bold letter). Here, the area is $\alpha_k \Delta_k$. In such a case, the estimation durations become the ones as illustrated in FIG. 13, and are more close to the actual delay profile. Even higher estimation accuracy results. $\Delta_k$ may be different from $\Delta_t$ in value, and the start of the duration candidate k may not be $k\Delta_t$. In such a case, a duration candidate including a delay time $k\Delta_t$ may be selected.

Operation of the Receiver Apparatus b1

Figure 14:
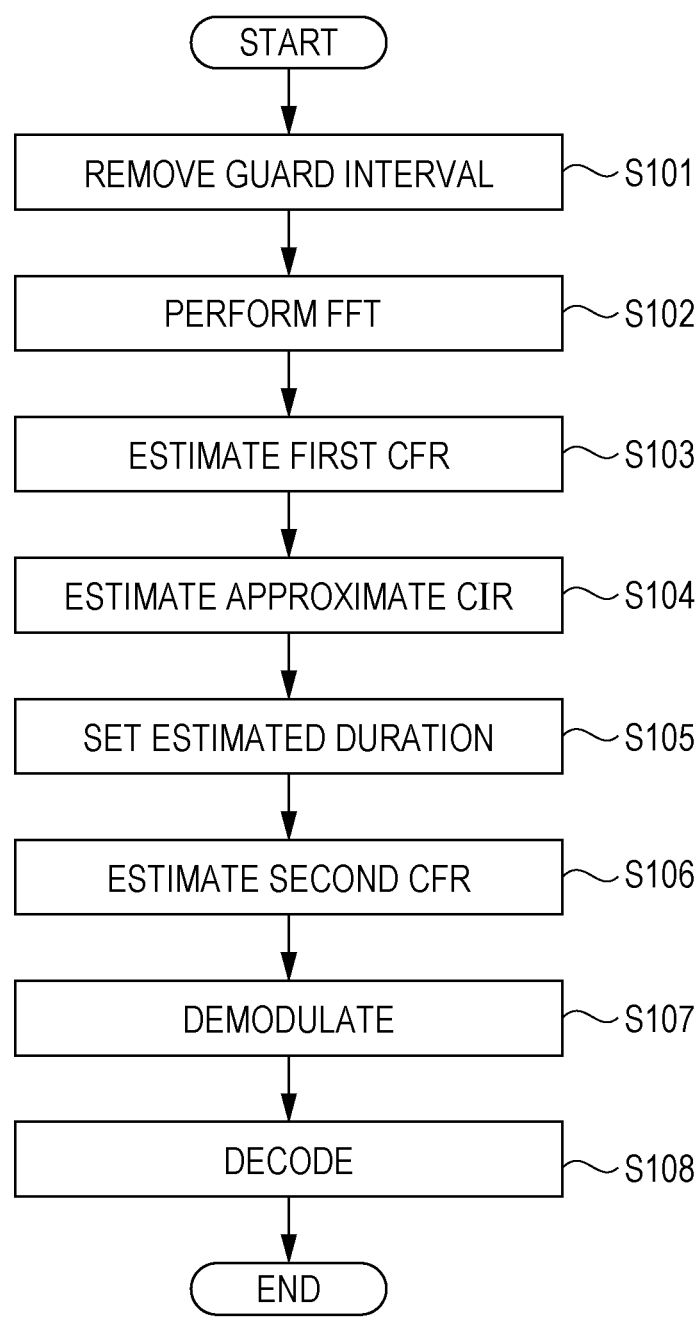
FIG. 14 is a flowchart illustrating an operation of the receiver apparatus of the first embodiment of the present invention.

FIG. 14 is a flowchart illustrating an operation of the receiver apparatus of the embodiment. The operation illustrated in FIG. 14 is performed after the reception unit b102 of FIG. 4 outputs the reception signal to the GI remover b103.

Step S101 The GI remover b103 removes the guard interval from the reception signal. Processing then proceeds to step S102.

Step S102 The FFT unit b104 time-frequency transforms the signal obtained in step S101. The demapping unit b105 separates data and a pilot from the obtained signal in the frequency domain. The demapping unit b105 outputs the reception signal of the pilot subcarrier to the first CFR estimator b106 and then proceeds to step S103.

Step S103 The first CFR estimator b106 performs channel estimation using the reception signal of the pilot subcarrier obtained in step S102, thereby calculating the first CFR estimation value. The first CFR estimator b106 then outputs the first CFR estimation value to the duration extractor b107 and the second CFR estimator b108.

Processing Proceeds to Step S104.

Step S104 The approximate CIR estimation unit b107-1 in the duration extractor b107 performs IFFT on the first CFR estimation value obtained in step S103, thereby calculating an approximate CIR estimation value. Processing proceeds to step S105.

Step S105 The path extraction unit b107-2 extracts a predetermined number of paths of the approximate CIRs obtained in step S104 in the order of high to low power. The corresponding duration determining unit b107-3 sets the estimation durations corresponding to these paths. The estimation durations thus set are output to the second CFR estimator b108. Processing proceeds to step S106.

Step S106 The second CFR estimator b108 calculates the second CFR estimation value using the first CFR estimation value obtained in step S103 and the estimation duration obtained in step S105. Processing proceeds to step S107.

Step S107 The demodulator b109 performs a demodulation operation using the second CFR estimation value obtained in step S106. Processing proceeds to step S108.

Step S108 The decoder b110 decodes the demodulation result obtained in step S107. The receiver apparatus b1 completes the operation thereof.

In accordance with the present embodiment, the channel estimator calculates the first CFR estimation value using the pilot symbol, extracts a path, whichever has higher power, out of the approximate CIRs obtained as a result of the IFFT on the first CFR estimation value, determines the estimation duration from the selected path, and calculates the second CFR estimation value using the first CFR estimation value and the estimation duration. In this way, the power delay profile for use in the estimation is allocated to the delay time where actual power is present, and is not allocated to the delay time where no power is present. Suppression effect on noise and interference is thus increased. The channel estimation accuracy is thus improved.

In the discussion of the first embodiment, the communication system performs multi-carrier signal communications. The present invention is not limited to this. The present invention is applicable to single-carrier communications that are performed using FFT. The same is true of other embodiments described below.

In the discussion of the first embodiment, each estimation duration is rectangular. In the present invention, the estimation duration is not limited to a rectangular shape. The estimation duration may be trapezoidal or triangular. For example, a duration that exponentially attenuate may be segmented into K durations.

In the first embodiment, the first CFR estimation value is calculated using the pilot subcarrier of the symbol as represented in Equation (11). The pilot subcarrier of a different symbol may be used. For example, the first symbol of FIG. 2 may be considered. In this case, a variation with time toward the fifth symbol may be sufficiently small, and the first CFR estimation value determined by the pilot subcarrier of the fifth symbol may also be used in the first symbol as well. The pilot subcarriers of the first symbol may be substantially increased, for example, to include a first subcarrier, a subcarrier higher than the first subcarrier by three subcarriers along the frequency axis, a subcarrier higher by six subcarriers, . . . . The estimation value may be applied to a symbol having no pilot subcarrier. For example, the estimation values of the second through fourth symbols of FIG. 2 may be the estimation values of the first subcarrier, the subcarrier higher by three subcarriers, the subcarrier by six subcarriers . . . as described above. If the variation with time is not negligible, linear interpolation may be performed among the pilot subcarriers. For example, in the first subcarrier of FIG. 2, linear interpolation may be performed on second through seventh symbols interposed between the first symbol and the eighth symbol. The same is true of the other embodiments to be described below.

The estimation duration determined in one OFDM symbol may be used in another OFDM symbol. For example, an estimation duration may now be set in an i-th OFDM symbol. The same estimation duration may be used in an (i+1) OFDM symbol if the variation with time of the channel is small. Since the operation of the duration extractor b107 is omitted in the (i+1) OFDM symbol in this way, an amount of calculation is reduced. The same is true of the other embodiments described below.

In accordance with the first embodiment, the predetermined number of paths in the order from high to low power in a case that the paths are to be extracted from the approximate CIR estimation values. A threshold value may be set up by multiplying the noise power by a predetermined value, and the paths above the threshold value may be extracted. The predetermined value to be multiplied may be fixed in the design phase of the receiver apparatus b1 or may be updated when firmware or software of the receiver apparatus b1 is updated.

Second Embodiment

A second embodiment of the present invention is described in detail below with reference to the drawings. In the first embodiment, the transmitter apparatus a1 transmits a multi-carrier signal and the like where the pilot symbol is mapped in the frequency domain. The receiver apparatus b1 calculates the first CFR estimation value in the pilot subcarrier, extracts the paths higher in power from the approximate CIR estimation values in the pilot subcarriers calculated from the first CFR estimation value, sets the estimation durations corresponding to the paths, and then calculates the second CFR estimation value using the first CFR estimation value and the estimation duration. In a method of the present embodiment described below, durations as a result of segmentation by K are set to be duration candidates and which duration candidate to select is determined through repeated tests by actually calculating the second CFR estimation value.

Figure 15:
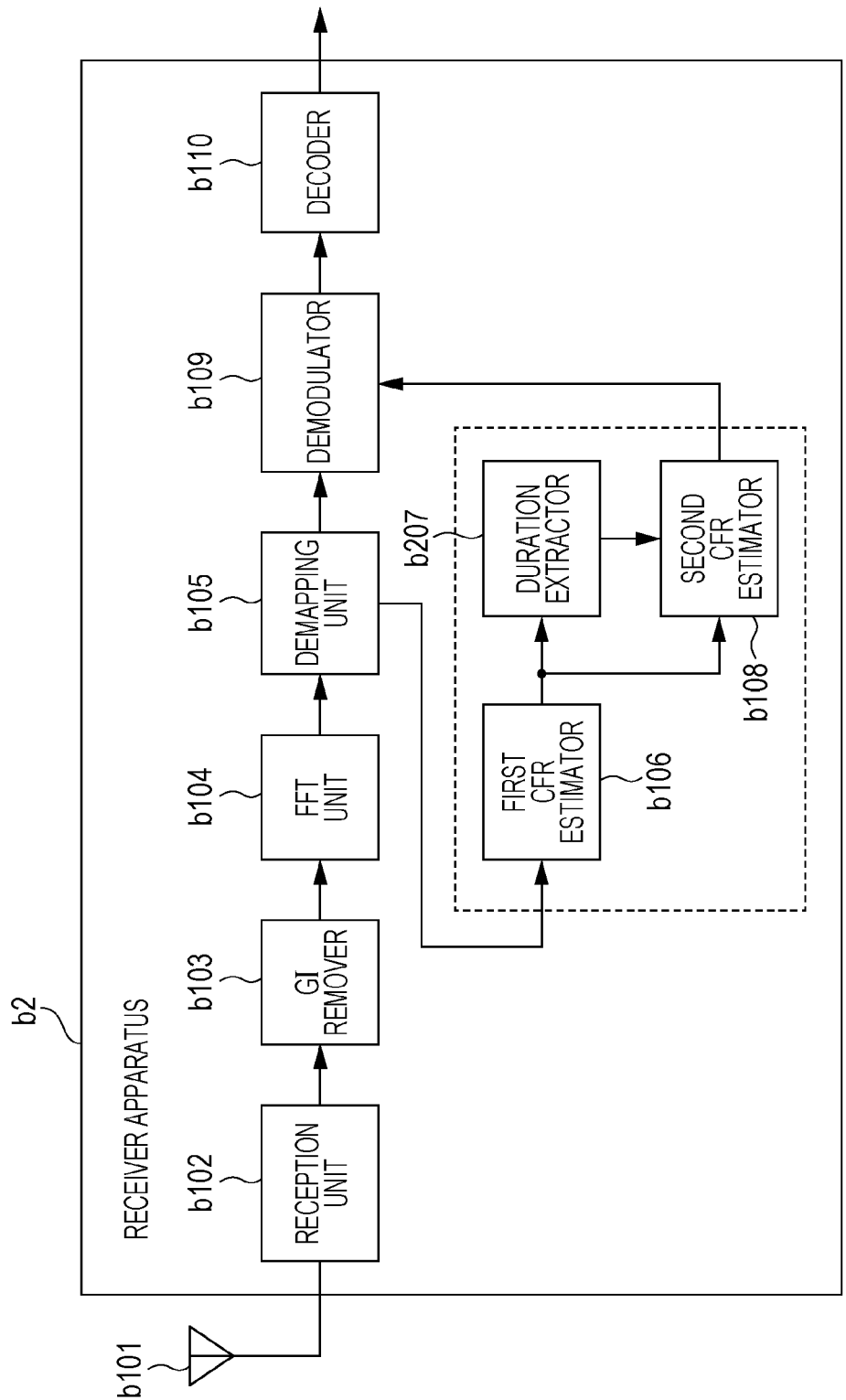
FIG. 15 is a block diagram diagrammatically illustrating a configuration of a receiver apparatus of a second embodiment of the present invention.

FIG. 15 is a block diagram diagrammatically illustrating a configuration of a receiver apparatus b2 of the second embodiment of the present invention. By comparison of the receiver apparatus b2 (FIG. 15) of the present embodiment with the receiver apparatus b1 of the first embodiment (FIG. 4), the duration extractor b207 is different. However, the functions of the remaining elements (the receive antenna b101, the reception unit b102, the GI remover b103, the FFT unit b104, the demapping unit b105, the first CFR estimator b106, the second CFR estimator b108, the demodulator b109, and the decoder b110) are identical to those of the counterparts in the first embodiment. The discussion of the functions identical to those of the first embodiment is omitted herein.

Figure 16:
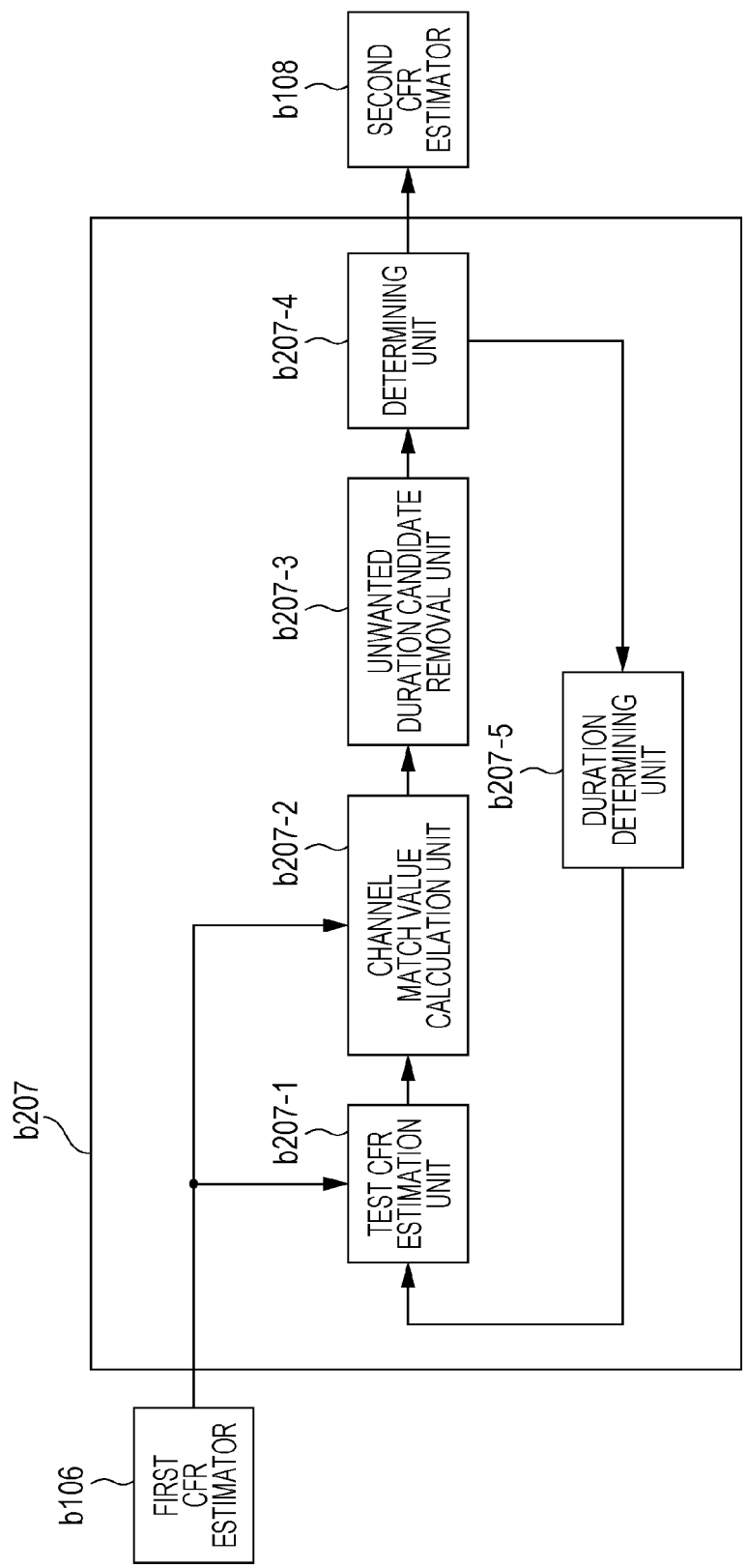
FIG. 16 is a block diagram diagrammatically illustrating a configuration of a duration extractor b207.

FIG. 16 is a block diagram diagrammatically illustrating a configuration of the duration extractor b207. The duration extractor b207 includes a test CFR estimating unit b207-1, a channel match value calculation unit b207-2, an unwanted duration candidate removal unit b207-3, a determining unit b207-4, and a duration determining unit b207-5. The term test CFR estimation value is a second CFR estimation value, which is calculated from an estimation duration candidate, as a combination of duration candidates, and a first frequency response estimation value. The duration extractor b207 predicts the estimation accuracy of the test CFR estimation value, and then determines the estimation duration that improves the estimation accuracy, through iterative operations. The term channel match value indicates a quantity as to how good the test CFR estimation value estimated using a given estimation duration candidate matches the first CFR estimation value. In accordance with the present invention, an estimation value having a high channel match value is determined to be an estimation value having a high estimation accuracy. The channel match value is described in detail below.

The duration extractor b207 includes a temporary memory for use in extracting the estimation duration. The temporary memory is represented by the following variables.

selected_interval: a selected duration is stored. The default state thereof is empty.

canidate_intervals: a duration candidate is stored. The default value thereof is [0, 1, . . . , K−1].

estimate_interval_candidates: an estimation duration candidate is stored. The default value thereof is any value.

estimated_H: A test CFR estimation value is stored. The default value thereof is any value.

channel_match: A channel match value is stored. The default value thereof is any value.

channel_match_prev: A channel match value determined in the immediately preceding iterative operation is stored. The default value thereof of −∞.

The test CFR estimating unit b207-1 generates an estimation duration candidate by adding, to selected_interval, each element of candidate_intervals, and stores the estimation duration candidate to estimate_interval_candidates. Using each candidate of the estimate_interval_candidates, the test CFR estimating unit b207-1 calculates the test CFR estimation value in accordance with Equations (13) through (18), and stores the results on estimated_H. For example, since selected_interval is empty, and candidate_intervals are [0, 1, . . . , K−1] in a first iterative operation, estimate_interval_candidates are [[0], [1], . . . , [K−1]]. If selected_interval is [0,2], and candidate_intervals are [1,3,5] in a third iterative operation, estimate_interval_candidates are [[0,2,1], [0,2,3], [0,2,5]].

The channel match value calculation unit b207-2 calculates the channel match value on each of estimated_H. For example, the mean-squared error of the test CFR estimation value and the first CFR estimation value may be used as the channel match value. More specifically, the following Equation (21) may be used.

[Meth. 12]

$$-\frac{1}{P_{i'}} \sum_{p=0}^{P_{i'*}-1} |H''_{i,n_{i'*}}(p) - H'_{i'*,n_{i'*}}(p)|^2 \quad (21)$$

An i'-th symbol is different from the i-th symbol on which the test CFR estimation value has been calculated. For example, if the test CFR estimation value is calculated from the first symbol of FIG. 2, the fifth symbol may be the i'-th symbol. Other symbols may be used. For example, a past symbol or a future symbol may be used. The symbol different from the i-th symbol is used because of the following reason. If the symbols based on the same noise system are compared, overlearning takes place. This may lead to an increase in the final number of selected durations. This calculation is performed on each test CFR estimation value and the results are stored on channel_match.

If there is any one, present among a plurality of channel match values stored on channel_match, lower than the channel match value determined in the immediately preceding iterative operation stored on channel_match_prev, the unwanted duration candidate removal unit b207-3 deletes the corresponding element of candidate_intervals. This is because the estimation performed with the duration added will not increase the estimation accuracy. Further addition of durations is considered to be unnecessary. No immediately preceding iterative operation is present in the first operation, and the value stored on channel_match_prev is −∞No deletion is thus performed.

The determining unit b207-4 determines whether to complete the iterative operation. Since empty candide_intervals means that the addition of any duration candidate to the duration determined in the immediately preceding iterative operation fails to increase the channel match value, the estimation duration determined in the immediately preceding iterative operation and stored on selected_interval is set to be a final duration and is output to the second CFR estimator b108. The iterative operation thus ends. If the number of elements remaining in candidate_intervals is one, that remaining duration candidate means a final candidate that, if added to the duration determined in the immediately preceding iterative operation, increases the channel match value. The corresponding element on estimate_interval_candidates is output to the second CFR estimator b108 as the estimation duration. The process thus ends. If the two conditions described above are not satisfied, the iterative operation is repeated. The corresponding test CFR estimation value may be output to the second CFR estimator b108 instead of the estimation duration. In such a case, the second CFR estimator b108 does not estimate the second CFR estimation value, and outputs to the demodulator b109 the input CFR estimation value as the second CFR estimation value. Even if the number of elements remaining in candidate_intervals is not one, the process may end. For example, if the number of elements remaining in candidate_intervals is smaller, such as two or three, the process may end. In such a case, all the elements of the remaining duration candidates or only the largest element may be added to the estimation duration determined in the immediately preceding iterative operation.

The duration determining unit b207-5 selects the largest element on channel_match and then determines as part of the new estimation duration the duration candidate corresponding to the largest element. Specifically, the duration determining unit b207-5 stores the selected element of channel_match on channel_match_prev, deletes the corresponding duration candidate from candidate_intervals, and adds the duration candidate as a new element on selected_interval. The process of the test CFR estimating unit b207-1 then resumes to move to a next iterative operation.

These operations are performed until the determining unit b207-4 performs an end determination operation.

Operation of the Receiver Apparatus b2

Figure 17:
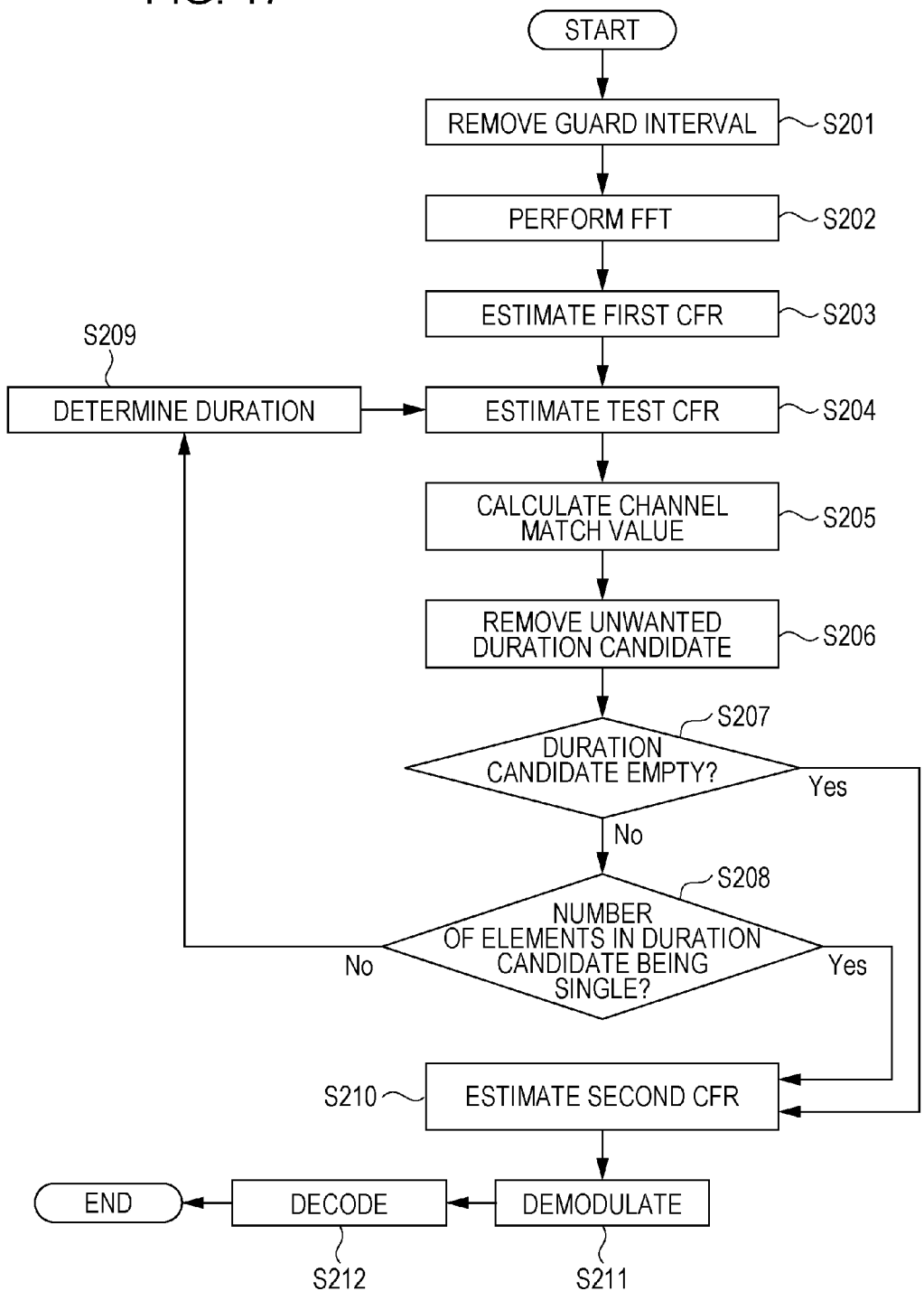
FIG. 17 is a flowchart illustrating an operation of the receiver apparatus of the second embodiment of the present invention.

FIG. 17 is a flowchart illustrating an operation of the receiver apparatus of the present embodiment. The operation illustrated in FIG. 17 is performed after the reception unit b102 of FIG. 15 outputs the reception signal to the GI remover b103.

Step S201 The GI remover b103 removes the guard interval from the reception signal. Processing then proceeds to step S202.

Step S202 The FFT unit b104 time-frequency transforms the signal obtained in step S201. The demapping unit b105 separates data and a pilot from the obtained signal in the frequency domain. The demapping unit b105 outputs the reception signal of the pilot subcarrier to the first CFR estimator b106 and then proceeds to step S203.

Step S203 The first CFR estimator b106 performs channel estimation using the reception signal of the pilot subcarrier obtained in step S202, thereby calculating the first CFR estimation value. The first CFR estimator b106 then outputs the first CFR estimation value to the duration extractor b207 and the second CFR estimator b108.
Processing Proceeds to Step S204.

Step S204 The test CFR estimating unit b207-1 in the duration extractor b207 generates the estimation duration candidate by adding the remaining duration candidate to the estimation duration already determined, and then calculates the test CFR estimation value using each estimation duration candidate and the first CFR estimation value obtained in step S203. The test CFR estimating unit b207-1 outputs the results to the channel match value calculation unit b207-2, and then proceeds to step S205.

Step S205 The channel match value calculation unit b207-2 calculates the channel match value using each test CFR estimation value obtained in step S204 and the first CFR estimation value obtained in step S203, and then outputs the calculated channel match value to the unwanted duration candidate removal unit b207-3. Processing proceeds to step S206.

Step S206 If there is any one, present among a plurality of channel match values obtained in step S205, lower than the channel match value determined in the immediately preceding iterative operation in step S209, the unwanted duration candidate removal unit b207-3 deletes the corresponding duration candidate. In the first operation, step S209 is not executed yet, and the comparison and deletion are not performed. Processing proceeds to step S207.

Step S207 Upon detecting the absence of duration candidate as a result of step S206, the determining unit b207-4 outputs to the second CFR estimator b108 the estimation duration determined in the immediately preceding iterative operation in step S209, and proceeds to step S210. Otherwise, the determining unit b207-4 proceeds to step S208.

Step S208 Upon detecting the presence of one remaining duration candidate as a result of step S206, the determining unit b207-4 selects one of the test CFR estimation values obtained in step S204 corresponding to the remaining estimation duration, outputs the estimation duration candidate used in the calculation of the test CFR estimation value to the second CFR estimator b108 as the estimation duration, and then proceeds to S210. Otherwise, processing proceeds to step S209.

Step S209 The duration determining unit b207-5 selects the largest channel match value from among the remaining channel match values in step S206, and then stores the selected channel match value. The duration determining unit b207-5 deletes from the duration candidates the element of the duration candidate corresponding to that channel match value, and then adds the element of the duration candidate to the estimation durations. The element of the duration candidate is set to be a newly determined estimation duration. Processing returns to step S204.

Step S210 The second CFR estimator b108 calculates the second CFR estimation value using the estimation duration obtained in step S208 or in step S209, and outputs the second CFR estimation value to the demodulator b109.
Processing Proceeds to Step S211.

Step S211 The demodulator b109 performs a demodulation operation using the second CFR estimation value obtained in step S210. Processing proceeds to step S211.

Step S212 The decoder b110 decodes the demodulation result obtained in step S211. The receiver apparatus b2 completes the operation thereof.

In accordance with the present embodiment, the duration extractor b207 detects the duration candidates one by one that increase the channel match value, and then determines the estimation duration. In this way, the power delay profile for use in the estimation is allocated to the delay time where actual power is present, and is not allocated to the delay time where no power is present. Suppression effect on noise and interference is thus increased. The channel estimation accuracy is improved. The duration that does not increase the channel match value is concurrently deleted, substantially reducing an amount of calculation.

In the discussion of the first second embodiment, one estimation duration is determined at a time. The number of estimation durations that are determined at a time may be increased. The number of estimation durations that are determined at a time may be determined beforehand, or may be set to be variable and then updated when firmware or software of the receiver apparatus b1 is updated.

In the method of the second embodiment, the duration candidates are detected one by one, and the duration candidate that is unable to increase the channel match value is concurrently deleted. The deletion operation may be omitted.

In the second embodiment, the power $\alpha_k$ of the duration candidate k is a constant in Equation (17). Alternatively, the power $\alpha_k$ may be selected from a plurality of candidates. For example, $0.5/\Delta_f$, $0.25/\Delta_f$, and $0.125/\Delta_f$ are prepared as the candidates of the power $\alpha_k$, and the channel match value may be calculated on each of the candidates. The largest channel match value of the three values may be stored on channel_match as the channel match value of the duration candidate k.

In the second embodiment, the first CFR estimation value for use in the calculation of the channel match value of the test CFR estimation value that has been calculated using a given estimation duration candidate is that of a different symbol. But the first CFR estimation value is not limited to that of the different symbol. As long as the first CFR estimation value is that of a different noise sequence, it is acceptable. For example, the first CFR estimation value for use in the calculation of the test CFR estimation value in the first symbol of FIG. 2 may be the first subcarrier, the subcarrier higher than the first subcarrier by 12 subcarriers along the frequency axis, the subcarrier higher by 24 subcarriers, . . . , in steps of one notch of 12 subcarriers. The sequence of the subcarrier higher than the first subcarrier by six subcarriers, the subcarrier higher by 18 subcarriers, the subcarrier higher by 30 subcarriers . . . may be used in the calculation of the channel match value.

In the second embodiment, the mean-squared error of the test CFR estimation value and the first CFR estimation value is used as the channel match value. The cross-correlation of the test CFR estimation value and the first CFR estimation value may be used in place of the mean-squared error.

In the second embodiment, the mean-squared error or cross-correlation of the test CFR estimation value and the first CFR estimation value is used as the channel match value. The cross-correlation of the test CFR estimation value and the first CFR estimation value may be used in place of the mean-squared error. In addition, a penalty determined by the shape of the estimation duration may be added to each of the mean-squared error or cross-correlation. This is described further below.

Noise added to $H_{i,p}$ (H is a bold letter) is typically regarded as white Gaussian noise. Likelihood function $p(H_{i,p}|H)$ (H is a bold letter) of $H_{i,p}$ (H is a bolder letter) is expressed by the following Equation (22).

[Math. 13]

$$p(H_{i,p} \mid H) = \frac{1}{\pi^{P_i} \sigma_z^{2P_i}} \exp\left[-\frac{(H_{i,p} - H)^H (H_{i,p} - H)}{\sigma_z^2}\right] \quad (22)$$

Here, H (H is a bold letter) is a variable vector of the test CFR estimation value. For the simplicity of description, however, H is a vector of size $P_i$ having an element of a pilot subcarrier of the i-th symbol. Based on the assumption that H (H is a bold letter) has also a Gaussian distribution, the prior distribution of p(H) (H is a bold letter) is represented by the following Equation (23).

[Math. 14]

$$p(H) = \frac{1}{\pi^{P_i} \det(R_{H_{i,p}H_{i,p}})} \exp\left[-H^H R_{H_{i,p}H_{i,p}}^{-1} H\right] \quad (23)$$

If the likelihood function and the prior distribution are used, a model evidence is calculated as represented in the following Equation (25). The model evidence represents how an estimation vector H'$_i$ (H is a bold letter) using a correlation matrix $R_{H_{i,p}H_{i,p}}$ (R is a bold letter) represented by the following Equation (24) fits $H_{i,p}$ (H is a bold letter) of Equation (12).

[Math. 15]

$$H'_i = R_{H_{i,p}H_{i,p}} (R_{H_{i,p}H_{i,p}} + \sigma_z^2 I_{P_i})^{-1} H_{i,p} \int_H p(H_{i,p} \mid H) p(H) \quad (24)$$

$$= \frac{1}{\sigma_z^2} H_{i,p}^H H'_i - \ln\left[\det\left(\frac{1}{\sigma_z^2} R_{H_{i,p}H_{i,p}} + I_{P_i}\right)\right] + \text{const} \quad (25)$$

Here, Equation (24) represents a vector in which only the elements of the pilot subcarriers of the i-th symbol out of the estimation values obtained in Equation (13) are arranged.

Equation (25) represents the channel match value in a case that the penalty is added. The first term of Equation (25) is obtained by dividing the cross-correlation of the test CFR estimation value and the first CFR estimation value by the noise power. The mean-squared error may be used instead of the cross-correlation.

The second term represents the penalty in a case that $R_{H_{i,p}H_{i,p}}$ (R is a bold letter) is used, and controls an increase more than necessary in the final estimation durations.

Since the third term is a constant independent of $R_{H_{i,p}HH_{i,p}}$ (R is a bold letter), the channel match value calculation unit b207-2 does not perform the addition operation. The use of the channel match value including such a penalty controls the problem of overlearning, and the first CFR estimation value for use in the calculation of the channel_match value may be based on the same symbol of the test CFR estimation value. This is effective when the channel varies at a high speed.

The value of penalty may be a value that is determined beforehand, such as the Bayesian information criterion or the Akaike's information criterion. Let the number of durations selected in the process of the duration extractor b207 be a parameter count m, and the channel match value using the Bayesian information criterion is represented by the following Equation (26).

[Math. 16]

$$\frac{1}{\sigma_z^2} H_{i,p}^H H'_i - \ln(P_i) m \quad (26)$$

The use of Equation (16) eliminates the need to calculate the penalty. The Akaike's information criterion represented by the following Equation (27) may be used or another information criterion may be used.

[Math. 17]

$$\frac{1}{\sigma_z^2} H_{i,p}^H H'_i - 2m \quad (27)$$

Third Embodiment

A third embodiment of the present invention is described in detail with reference to the drawings. In the first embodiment, the transmitter apparatus a1 transmits a multi-carrier signal and the like where the pilot symbol is mapped in the frequency domain. The receiver apparatus b1 calculates the first CFR estimation value in the pilot subcarrier, extracts the paths higher in power from the approximate CIR estimation values calculated from the first CFR estimation value, sets the estimation durations corresponding to the paths, and then calculates the second CFR estimation value using the first CFR estimation value and the estimation duration. On the other hand, in the second embodiment, durations as a result of segmentation by K are set to be duration candidates and which duration candidate to select is determined through repeated tests by actually calculating the second CFR estimation value. In the same manner as in the first embodiment, in the present embodiment, the paths higher in power are extracted from the approximate CIR estimation values, the estimation duration corresponding to the paths is set, and the second CFR estimation value is calculated using the first CFR estimation value and the estimation duration. In the method of the present embodiment described below, however, the number of paths to be extracted are prepared in a plurality of patterns. A plurality of second CFR estimation values obtained as a result is set to be the test CFR estimation values, and which test CFR estimation value to use is determined based on the channel match value used in the second embodiment.

Figure 18:
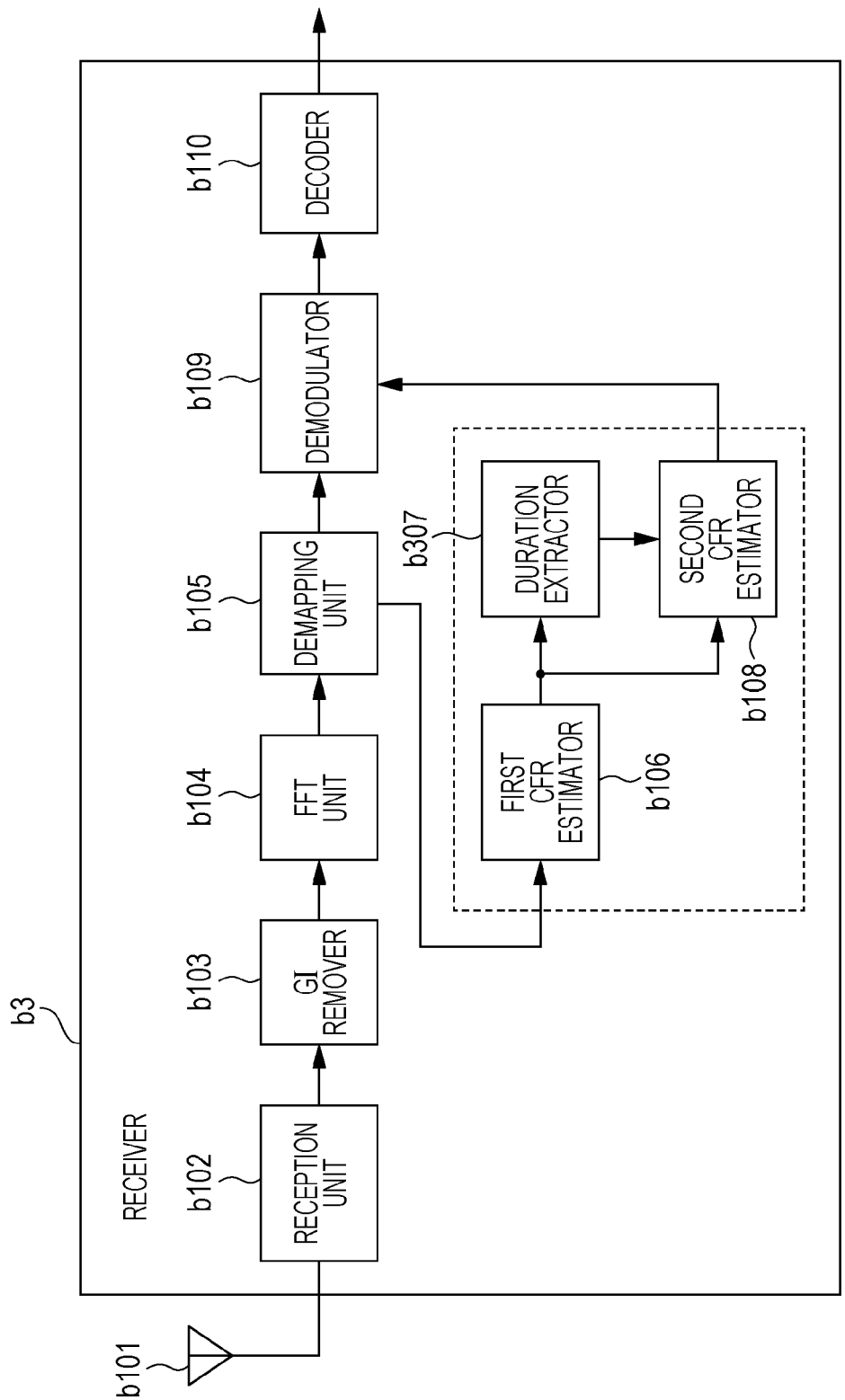
FIG. 18 is a block diagram diagrammatically illustrating a configuration of a receiver apparatus of a third embodiment of the present invention.

FIG. 18 is a block diagram diagrammatically illustrating a configuration of a receiver apparatus b3 of a third embodiment of the present invention. By comparison of the receiver apparatus b3 (FIG. 18) of the present embodiment with the receiver apparatus b1 of the first embodiment (FIG. 4), the duration extractor b307 is different. However, the functions of the remaining elements (the receive antenna b101, the reception unit b102, the GI remover b103, the FFT unit b104, the demapping unit b105, the first CFR estimator b106, the second CFR estimator b108, the demodulator b109, and the decoder b110) are identical to those of the first embodiment. The discussion of the functions identical to those of the first embodiment is omitted herein.

Figure 19:
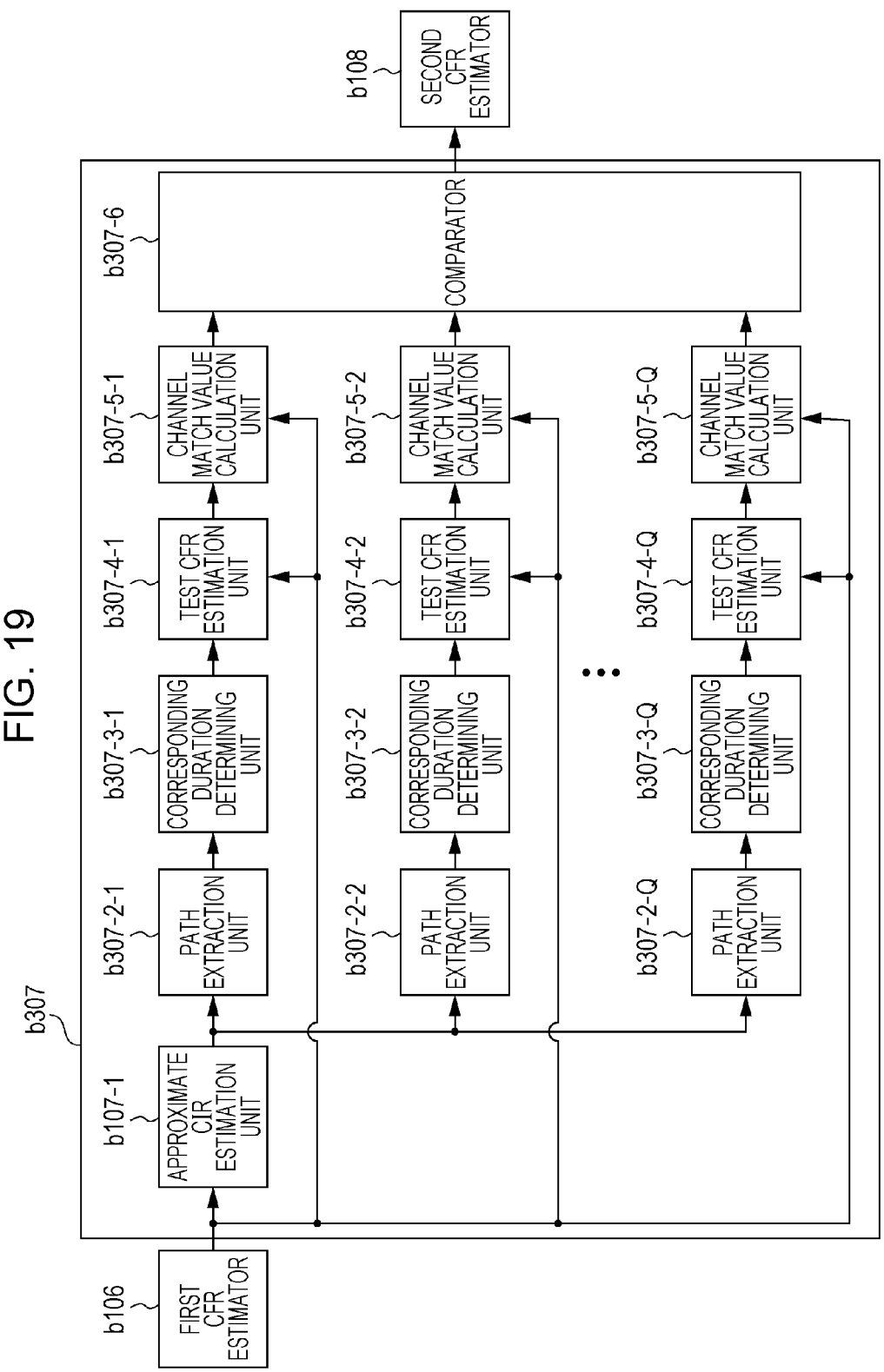
FIG. 19 is a block diagram diagrammatically illustrating a configuration of a duration extracting unit b307.

FIG. 19 is a block diagram diagrammatically illustrating a configuration of the duration extracting unit b307. As illustrated in FIG. 19, the duration extractor b307 includes an approximate CIR estimation unit b107-1, a path extraction unit b307-2-$q$, a corresponding duration determining unit b307-3-$q$, a test CFR estimation unit b307-4-$q$, a channel match value calculation unit b307-5-$q$, and a comparator b307-6. Here, q=1, 2, . . . , or Q, where there is a plurality of paths to be extracted and Q is the number of paths. The approximate CIR estimation unit b107-1 is identical to the approximate CIR estimation unit b107-1 in the duration extractor b107 (FIG. 5) of the first embodiment. The discussion of the function of the approximate CIR estimation unit b107-1 is omitted herein.

The path extraction unit b307-2-$q$ extracts a path having higher power using the approximate CIR estimation value input from the approximate CIR estimation unit b107-1. The number of paths to be extracted is different depending on q. The number of paths to be extracted may be fixed in the design phase of the receiver apparatus b3 or may be updated when firmware or software of the receiver apparatus b3 is updated. Information about the paths extracted by the path extraction unit b307-2-$q$ is output to the corresponding duration determining unit b307-3-$q$.

The corresponding duration determining unit b307-3-$q$ determines as an estimation duration a duration corresponding to the extracted path input from the path extraction unit b307-2-$q$. The corresponding duration determining unit b307-3-$q$ outputs the determined estimation duration to the test CFR estimation unit b307-4-$q$.

The test CFR estimation unit b307-4-$q$ calculates the test CFR estimation value using the estimation duration input from the corresponding duration determining unit b307-3-$g$ and the first CFR estimation value input from the first CFR estimator b106. The test CFR estimation unit b307-4-$q$ outputs the estimation value to the channel match value calculation unit b307-5-$q$.

The channel match value calculation unit b307-5-$q$ calculates the channel match value using the test CFR estimation value input from the test CFR estimation unit b307-4-$q$ and the first CFR estimation value input from the first CFR estimator b106. The channel match value to be used in this case may be the one described with reference to the second embodiment. The calculated channel match value may be output to the comparator b307-6.

The comparator b307-6 selects the largest one from among Q channel match values input from the channel match value calculation units b307-5-$q$. The estimation duration corresponding to the selected channel match value is output to the second CFR estimator b108. Instead of the largest channel match value, any channel match value above a given threshold value may be selected from the Q channel match values. The threshold value may be fixed in the design phase of the receiver apparatus b3 or may be updated when firmware or software of the receiver apparatus b3 is updated. The test CFR estimation value corresponding to the selected channel match value may be output to the second CFR estimator b108. In such a case, the second CFR estimator b108 outputs the input test CFR estimation value as the second CFR estimation value to the demodulator b109 rather than performing the estimation operation.

Operation of the Receiver Apparatus b3

Figure 20:
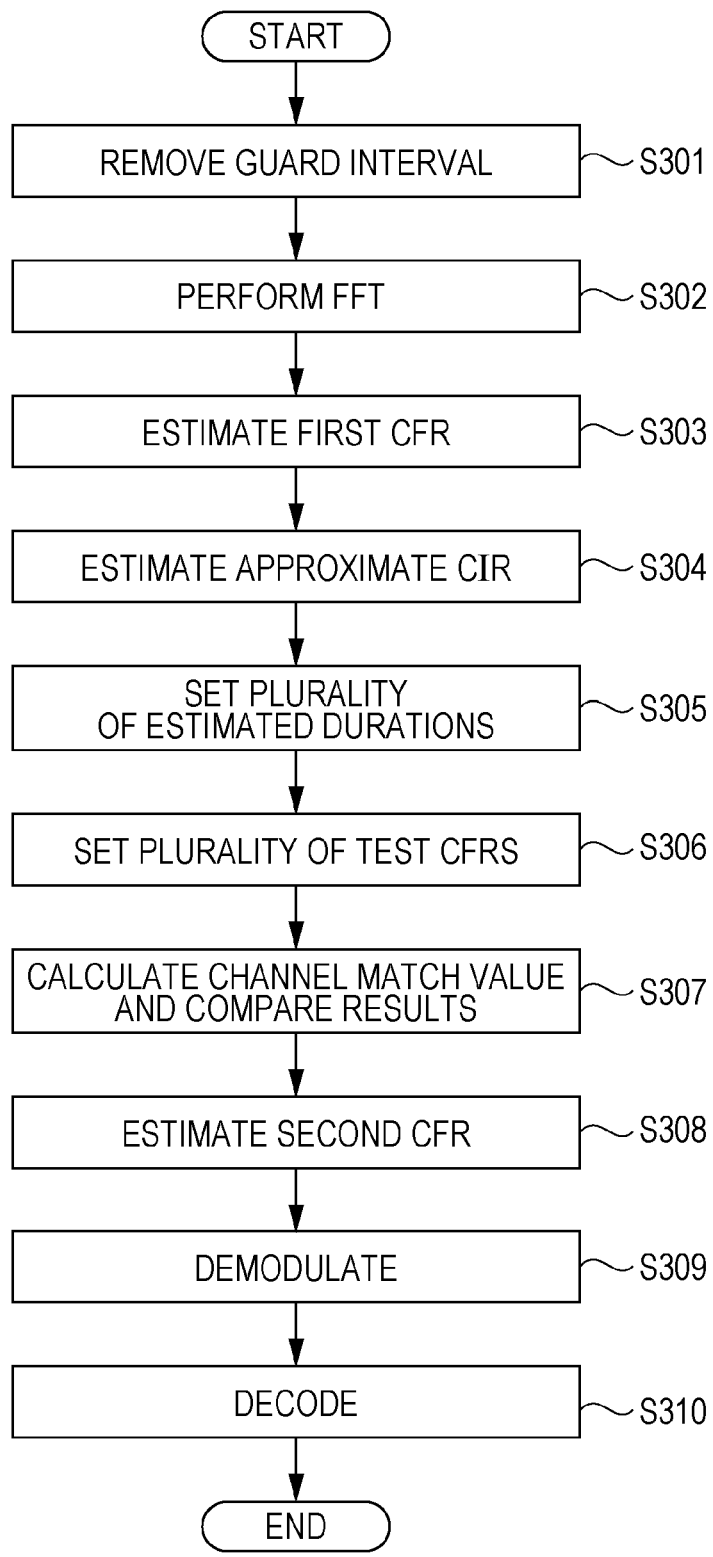
FIG. 20 is a flowchart illustrating an operation of the receiver apparatus of the third embodiment of the present invention.

FIG. 20 is a flowchart illustrating an operation of the receiver apparatus of the present embodiment. The operation illustrated in FIG. 20 is performed after the reception unit b102 of FIG. 18 outputs the reception signal to the GI remover b103.

Step S301 The GI remover b103 removes the guard interval from the reception signal. Processing then proceeds to step S302.

Step S302 The FFT unit b104 time-frequency transforms the signal obtained in step S301. The demapping unit b105 separates data and a pilot from the obtained signal in the frequency domain. The demapping unit b105 outputs the reception signal of the pilot subcarrier to the first CFR estimator b106 and then proceeds to step S303.

Step S303 The first CFR estimator b106 performs channel estimation using the reception signal of the pilot subcarrier obtained in step S302, thereby calculating the first CFR estimation value. The first CFR estimator b106 then outputs the first CFR estimation value to the duration extractor b307 and the second CFR estimator b108.
Processing Proceeds to Step S304.

Step S304 The approximate CIR estimation unit b107-1 in the duration extractor b307 performs IFFT on the first CFR estimation value obtained in step S303, thereby calculating an approximate CIR estimation value. Processing proceeds to step S305.

Step S305 The path extraction unit b307-2-$q$ extracts a predetermined number of paths of the approximate CIRs obtained in step S304 in the order of high to low power. The corresponding duration determining unit b307-3-$q$ sets the estimation duration corresponding to these paths. The estimation duration thus set is output to the test CFR estimation unit b307-4-$q$. Processing proceeds to step S306.

Step S306 The test CFR estimation unit b307-4-$q$ calculates the test CFR estimation value using the estimation duration obtained in step S305 and the first CFR estimation value obtained in step S303. Processing proceeds to step S307.

Step S307 The channel match value calculation unit b307-5-$q$ calculates the channel match value using the channel match value obtained in step S306 and the first CFR estimation value obtained in step S303. The comparator S307-6 selects the largest channel match value among the calculated the channel match values, and outputs the estimation duration corresponding to the selected channel match value to the second CFR estimator b108. Processing proceeds to step S308.

Step S308 The second CFR estimator b108 calculates the second CFR estimation value using the estimation duration obtained in step S307 and outputs the second CFR estimation value to the demodulator b109. Processing proceeds to step S309.

Step S309 The demodulator b109 performs a demodulation operation using the second CFR estimation value obtained in step S308. Processing proceeds to step S310.

Step S310 The decoder b110 decodes the demodulation result obtained in step S309. The receiver apparatus b3 completes the operation thereof.

In accordance with the present embodiment, the number of paths that are extracted in the order from high to low power is determined by the channel match value, and the estimation duration is determined from the extracted paths of that number. The number of extracted paths is set to be an optimum number. The channel estimation accuracy is thus increased. Since no iterative operation is performed, an amount of calculation is reduced.

In the third embodiment, the path extraction unit b307-2-$q$, the corresponding duration determining unit b307-3-$q$, the test CFR estimation unit b307-4-$q$, and the channel match value calculation unit b307-5-$q$ are connected in a cascade fashion and Q cascades are arranged in parallel. The configuration is not limited to this parallel arrangement. The path extraction unit, the corresponding duration determining unit, the test CFR estimation unit, and the channel match value calculation unit are connected in a cascade fashion and are successively operated with the number of extracted paths varied.

Part of the transmitter apparatus a1 and the receiver apparatuses b1 through b3 in the above embodiments, for example, the duration extractor b107 and the demodulator b109, may be implemented using a computer. In such a case, a program to implement the control function may be executed by recording the program on a computer readable recording medium, and reading the program recorded on the recording medium onto the computer system.

The term "computer system" refers to a computer system built into one of the transmitter apparatus a1, and the receiver apparatuses b1 through b3, and includes an OS and hardware such as a peripheral device. The term "computer readable recording medium" refers to a portable medium, such as a flexible disk, a magneto-optical disk, ROM, or CD-ROM, or a recording device, such as a hard disk, built into the computer system. The "computer readable recording medium" may include a communication line that holds dynamically the program for a short period of time. The communication line transmits the program via a communication channel such as a network like the Internet or a telephone line. The "computer readable recording medium" may also include a volatile memory in the computer system that may be a server or a client and stores the program for a predetermined period of time. The program may implement part of the above-described function. The part of the above-described function may be used in combination with a program previously recorded on the computer system.

Part or whole of the transmitter apparatus a1, and the receiver apparatuses b1 through b3 in the above embodiments, may be implemented as an integrated circuit such as LSI (Large Scale Integration). The function blocks of the transmitter apparatus a1, and the receiver apparatuses b1 through b3 may be individually implemented using processors, and part or whole of the function blocks may be integrated into a processor. The technique of integration is not limited to LSI. A dedicated circuit or a general-purpose processor may be employed. If a technique of circuit integration replacing the present LSI appears with the advance of semiconductor technique, an integrated circuit resulting from the technique may also be used.

The embodiments of the present invention have been described in detail with reference to the drawings. The specific configuration of the embodiments is not limited to the configuration described above. A variety of design changes is incorporated without departing from the scope of the present invention.

Industrial Applicability

The present invention find applications in a receiver apparatus, a reception method, a communication system, and a communication method.

REFERENCE SIGNS LIST a1 Transmitter apparatus
a101 Pilot generator
a102 Encoder
a103 Modulator
a104 Mapping unit
a105 IFFT unit
a106 GI insertion unit
a107 Transmission unit
a108 Transmit antenna
b1 Receiver apparatus
b101 Receive antenna
b102 Reception unit
b103 GI remover
b104 FFT unit
b105 Demapping unit
b106 First CFR estimator
b107, b207, and b307 Duration extractors
b107-1 Approximate CIR estimation unit
b107-2, b307-2-1 through b307-2-Q Path extraction units
b107-3, b307-3-1 through b307-3-Q Corresponding duration determining units
b108 Second CFR estimator
b109 Demodulator
b110 Decoder
b207-1, b307-4-1 through b307-4-Q Test CFR estimation units
b207-2, b307-5-1 through b307-5-Q Channel match value calculation units
b207-3 Unwanted duration candidate removal unit
b207-4 Determining unit
b207-5 Duration determining unit All the publications, patents and patent applications cited in this description are incorporated by reference in their entirety herein.

The invention claimed is:

1. A receiver apparatus comprising:
a first frequency response estimator configured to calculate a first frequency response estimation value using a reference signal;
a duration extractor configured to determine an estimation duration by extracting at least one duration from among a plurality of duration candidates into which a predetermined maximum delay time is divided; and
a second frequency response estimator configured to calculate a second frequency response estimation value as a frequency response estimation value for demodulation using the first frequency response and the estimation duration, wherein the duration extractor comprises:
an approximate channel impulse response estimating unit configured to calculate an approximate channel impulse response by frequency-time transforming the first frequency response estimation value;
a path extraction unit configured to extract a predetermined number of paths from paths forming the approximate channel impulse response; and
a corresponding duration determining unit configured to determine as the estimation duration a duration of the path extracted from the duration candidates including the delay time; and
a test frequency response estimating unit configured to calculate a plurality of test frequency response estimation values using the first frequency response and each estimation duration output by the corresponding duration determining unit;
a channel match value calculation unit configured to calculate a channel match value of each of the test frequency response estimation values using the first frequency response; and
a comparator configured to select an estimation duration to be used by the second frequency response estimator in accordance with the channel match value.

2. The receiver apparatus according to claim 1, wherein the channel match value calculation unit uses as the channel match value a mean-squared error of the test frequency response estimation value and the first frequency response estimation value.

3. The receiver apparatus according to claim 2, wherein the channel match value calculation unit uses as the channel match value a value resulting from adding a model evidence, as a penalty, determined by a shape of the estimation duration used to calculate the test frequency response estimation value.

4. The receiver apparatus according to claim 2, wherein the channel match value calculation unit uses as the channel match value a value resulting from adding a penalty of the Bayesian information criterion.

5. The receiver apparatus according to claim 2, wherein the channel match value calculation unit uses as the channel match value a value resulting from adding a penalty of the Akaike's information criterion.

6. The receiver apparatus according to claim 1, wherein the channel match value calculation unit uses as the channel match value a cross correlation between the test frequency response estimation value and the first frequency response estimation value.

7. A receiver apparatus comprising:
  a first frequency response estimator configured to calculate a first frequency response estimation value using a reference signal;
  a duration extractor configured to determine an estimation duration by extracting at least one duration from among a plurality of duration candidates into which a predetermined maximum delay time is divided; and
  a second frequency response estimator configured to calculate a second frequency response estimation value as a frequency response estimation value for demodulation using the first frequency response and the estimation duration, wherein the duration extractor further comprises:
  a test frequency response estimating unit configured to combine the duration candidates to result in an estimation duration candidate, and configured to calculate a test frequency response estimation value from the estimation duration candidate; and
  a channel match value calculation unit configured to calculate a channel match value from the test frequency response estimation value,
  wherein the duration extractor determines a plurality of estimation duration candidates, and calculates the estimation duration from the plurality of estimation duration candidates using the channel match value.

8. The receiver apparatus according to claim 7, wherein the duration extractor repeats an iterative operation to select at least one duration candidate and determines the estimation duration,
  wherein the test frequency response estimating unit generates an estimation duration candidate by adding at least one of the duration candidates to the estimation duration determined in the immediately preceding iterative operation,
  wherein the duration extractor comprises:
  an unwanted duration candidate removal unit configured to remove the duration candidate that has been used to calculate a channel match value lower than a maximum channel match value among the channel match values calculated in the immediately preceding iterative operation;
  a determining unit configured to stop repeating the iterative operation in a case that the remaining number of duration candidates subsequent to the duration candidate removal is zero, and configured to determine, as an estimation duration to be used by the second frequency response estimator, the estimation duration determined in the immediately preceding iterative operation; and
  a duration determining unit configured to extract a predetermined number of channel match values in the order of from large to small, configured to set to a new estimation duration a value resulting from adding a duration candidate used to calculate the channel match value to the estimation duration determined in the immediately preceding iterative operation, and configured to cause a next iterative operation initiated by the test frequency response estimating unit to be performed with the new estimation duration.

9. The receiver apparatus according to claim 8, wherein the number of elements as the duration candidate determined by the duration determining unit in a single iterative operation is one.

10. The receiver apparatus according to claim 8, wherein in a case that the number of channel match values subsequent to the duration candidate removal is a predetermined number other than 0 and 1, the determining unit determines, as an estimation duration to be used by the second frequency response estimator, a new estimation duration resulting from adding an element of the duration candidate used to calculate the remaining channel match values to the estimation duration determined in the immediately preceding iterative operation.

11. A receiving method comprising:
  calculating a first frequency response estimation value using a reference signal;
  determining, by a duration extractor, an estimation duration by extracting at least one duration from among a plurality of duration candidates into which a predetermined maximum delay time is divided; and
  calculating, by a second frequency response estimator, a second frequency response estimation value as a frequency response estimation value for demodulation using the first frequency response and the estimation duration;
  wherein the duration extractor performs:
  calculating an approximate channel impulse response by frequency-time transforming the first frequency response estimation value;
  extracting a predetermined number of paths from paths forming the approximate channel impulse response; and
  determining, by a corresponding duration determining unit, as the estimation duration a duration of the path extracted from the duration candidates including the delay time; and
  calculating a plurality of test frequency response estimation values using the first frequency response and each estimation duration output by the corresponding duration determining unit;
  calculating a channel match value of each of the test frequency response estimation values using the first frequency response; and
  selecting an estimation duration to be used by the second frequency response estimator in accordance with the channel match value.

* * * * *